US011350067B2

(12) United States Patent
Ota

(10) Patent No.: US 11,350,067 B2
(45) Date of Patent: May 31, 2022

(54) EVALUATION METHOD FOR IMAGE PROJECTION SYSTEM, IMAGE PROJECTION SYSTEM, AND IMAGE PROJECTION CONTROL APPARATUS

(71) Applicant: SEIKO EPSON CORPORATION, Tokyo (JP)

(72) Inventor: Susumu Ota, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/354,919

(22) Filed: Jun. 22, 2021

(65) Prior Publication Data

US 2021/0400246 A1 Dec. 23, 2021

(30) Foreign Application Priority Data

Jun. 23, 2020 (JP) .............................. JP2020-108187

(51) Int. Cl.
*H04N 9/31* (2006.01)
(52) U.S. Cl.
CPC ......... *H04N 9/3194* (2013.01); *H04N 9/3179* (2013.01)
(58) Field of Classification Search
CPC .................... H04N 9/3194; H04N 9/3179
See application file for complete search history.

(56) References Cited

U.S. PATENT DOCUMENTS

| 8,994,757 | B2* | 3/2015 | Surati | H04N 9/3147 |
| | | | | 345/690 |
| 10,802,384 | B2* | 10/2020 | Kaji | G02B 27/0068 |
| 2006/0187299 | A1* | 8/2006 | Miyazawa | H04N 9/3185 |
| | | | | 348/E9.027 |
| 2012/0050698 | A1 | 3/2012 | Kotani | |
| 2013/0208008 | A1* | 8/2013 | Otera | H04N 9/3182 |
| | | | | 345/634 |
| 2013/0342816 | A1 | 12/2013 | Furui | |
| 2017/0103687 | A1* | 4/2017 | Ano | G09G 3/002 |
| 2017/0127028 | A1* | 5/2017 | Oike | H04N 9/3185 |
| 2017/0208309 | A1* | 7/2017 | Oike | H04N 9/315 |
| 2018/0063494 | A1* | 3/2018 | Tanabe | H04N 9/3147 |
| 2018/0084234 | A1* | 3/2018 | Yamamoto | H04N 9/3147 |
| 2018/0150273 | A1* | 5/2018 | Tomita | G06F 3/0425 |
| 2018/0151098 | A1* | 5/2018 | Tomita | G09G 3/002 |

(Continued)

FOREIGN PATENT DOCUMENTS

| JP | 2006-245737 A | 9/2006 |
| JP | 2012-047849 A | 3/2012 |

(Continued)

*Primary Examiner* — Brian P Yenke
(74) *Attorney, Agent, or Firm* — Oliff PLC

(57) ABSTRACT

A first image, a second image, and a third image generated by a camera that captures a screen at a first timing, a second timing, and a third timing are sequentially acquired. The projection states of a first projector and a second projector at the third timing are caused to be the same as the projection states of the first and second projectors at the first timing. The projection state of the first projector is caused to differ from the projection state of the second projector at least one of the first timing or the second timing. Whether or not the first projector needs to be adjusted is evaluated based on the first image, the second image, and the third image.

11 Claims, 13 Drawing Sheets

(56) References Cited

U.S. PATENT DOCUMENTS

| | | | |
|---|---|---|---|
| 2018/0367768 A1* | 12/2018 | Nobori | H04N 9/3194 |
| 2019/0033985 A1* | 1/2019 | Ano | G03B 37/04 |
| 2019/0166336 A1* | 5/2019 | Shindo | H04N 7/0125 |
| 2019/0265847 A1* | 8/2019 | Ano | G06F 3/1423 |
| 2020/0077063 A1* | 3/2020 | Yamasaki | G03B 21/208 |
| 2020/0159483 A1* | 5/2020 | Yoshihara | G09G 5/006 |
| 2020/0389630 A1* | 12/2020 | Fujimori | H04N 9/3147 |
| 2020/0413015 A1* | 12/2020 | Asai | G06T 7/0002 |
| 2021/0035315 A1* | 2/2021 | Ota | G06T 3/4038 |
| 2021/0037221 A1* | 2/2021 | Kudo | H04N 9/3188 |
| 2021/0136339 A1* | 5/2021 | Kashiwagi | H04N 9/3191 |
| 2021/0168341 A1* | 6/2021 | Kubota | H04N 5/2257 |
| 2021/0235050 A1* | 7/2021 | Shishido | H04N 9/317 |
| 2021/0368150 A1* | 11/2021 | Kubota | H04N 9/3182 |
| 2021/0392311 A1* | 12/2021 | Ota | H04N 9/3194 |

FOREIGN PATENT DOCUMENTS

| | | | |
|---|---|---|---|
| JP | 2013-055505 A | 3/2013 | |
| JP | 2014-007517 A | 1/2014 | |

\* cited by examiner

EVALUATION METHOD FOR IMAGE PROJECTION SYSTEM, IMAGE PROJECTION SYSTEM, AND IMAGE PROJECTION CONTROL APPARATUS

The present application is based on, and claims priority from JP Application Serial Number 2020-108187, filed Jun. 23, 2020, the disclosure of which is hereby incorporated by reference herein in its entirety.

BACKGROUND

1. Technical Field

The present disclosure relates to an evaluation method for an image projection system, an image projection system, and an image projection control apparatus.

2. Related Art

There is a known technology relating to what is called "stack projection" in which images projected from a plurality of projectors are superimposed on one another (see JP-A-2014-7517, for example).

JP-A-2014-7517 describes that the position of an image pattern projected by a second projector is compared with the position of an image pattern projected by a first projector to adjust the position of video images projected by the second projector.

In the state in which the plurality of projectors perform the stack projection, however, it is difficult to identify a projector projecting an image that needs to be adjusted out of the plurality of projectors because the projectors project images in the same area so that the images are superimposed on one another.

Further, in the image display system described in JP-A-2014-7517, a pattern image needs to be projected from each of the projectors for adjustment of the projectors. It is therefore not possible to evaluate whether or not the projectors each needs to be adjusted, for example, with the projectors each projecting an image of a content.

SUMMARY

An aspect that solves the problem described above relates to an evaluation method including acquiring a first image generated by capturing a projection area at a first timing, acquiring a second image generated by capturing the projection area at a second timing after the first timing, acquiring a third image generated by capturing the projection area at a third timing after the second timing, causing projection states of a first projector and a second projector at the third timing to be the same as the projection states of the first projector and the second projector at the first timing, causing the projection state of the first projector to differ from the projection state of the second projector at least one of the first timing or the second timing, causing the first projector to project the projection image least at one of the first timing or the second timing, causing the second projector to project the projection image at least one of the first timing or the second timing, and evaluating whether or not the first projector needs to be adjusted based on the first image, the second image, and the third image, wherein the first projector and the second projector perform stack projection in the projection area.

Another aspect that solves the problem described above relates to an image projection system including a first projector and a second projector that perform stack projection in a projection area, a camera, and one or more processors programmed to acquire a first image generated by the camera that captures a projection area at a first timing, acquire a second image generated by the camera that captures the projection area at a second timing after the first timing, acquire a third image generated by the camera that captures the projection area at a third timing after the second timing, cause projection states of the first projector and the second projector at the third timing to be the same as the projection states of the first projector and the second projector at the first timing, cause the projection state of the first projector to differ from the projection state of the second projector at least one of the first timing or the second timing, cause the first projector to project a projection image at least one of the first timing or the second timing, cause the second projector to project the projection image at least one of the first timing or the second timing, and evaluate whether or not the first projector needs to be adjusted based on the first image, the second image, and the third image.

Another aspect that solves the problem described above relates to an image projection control apparatus including one or more processors programmed to acquire a first image generated by a camera that captures a projection area at a first timing, acquire a second image generated by the camera that captures the projection area at a second timing after the first timing, acquire a third image generated by the camera that captures the projection area at a third timing after the second timing, cause projection states of a first projector and a second projector at the third timing to be the same as the projection states of the first projector and the second projector at the first timing, cause the projection state of the first projector to differ from the projection state of the second projector at least one of the first timing or the second timing, cause the first projector to project a projection image at least one of the first timing or the second timing, cause the second projector to project the projection image at least one of the first timing or the second timing, and evaluate whether or not the first projector needs to be adjusted based on the first image, the second image, and the third image, wherein the image projection control apparatus communicably connected to the first projector, the second projector and the camera, and the first projector and the second projector perform stack projection in the projection area.

DESCRIPTION OF EXEMPLARY EMBODIMENTS

The present embodiment will be described below with reference to the drawings.

The present embodiment includes a first embodiment described with reference to FIGS. 6 to 8, a second embodiment described with reference to FIG. 9, a third embodiment described with reference to FIG. 10, a fourth embodiment described with reference to FIG. 11, a fifth embodiment described with reference to FIG. 12, and a sixth embodiment described with reference to FIG. 13.

Figure 1:
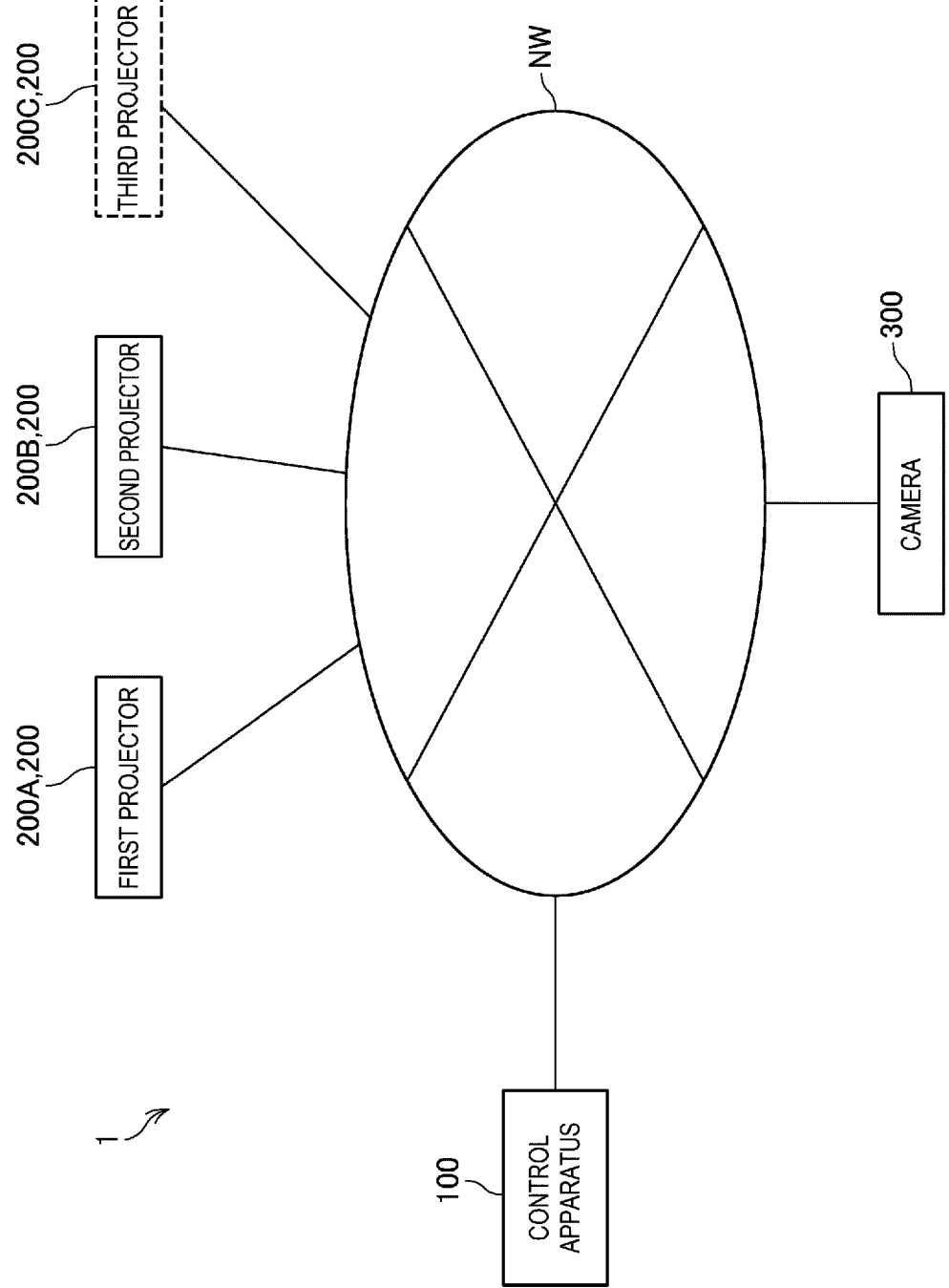
FIG. 1 shows an example of the configuration of an image projection system according to the present embodiment.

FIG. 1 shows an example of the configuration of an image projection system 1 according to the present embodiment.

The image projection system 1 includes a control apparatus 100, a plurality of projectors 200, and a camera 300. The control apparatus 100 is communicably connected to each of the plurality of projectors 200 and the camera 300 via a network NW. The network NW is, for example, a LAN (local area network) and allows communication to be performed in accordance with the Ethernet (registered trademark) standard.

The image projection system 1 includes, for example, a first projector 200A, a second projector 200B, and a third projector 200C as the plurality of projectors 200.

The first projector 200A to the third projector 200C have substantially the same configuration.

In the following description, when it is not particularly necessary to distinguish the first projector 200A to the third projector 200C from one another, they are called the projectors 200 in some cases.

The first, third, and fifth embodiments will be described with reference to a case where two projectors 200, the first projector 200A and the second projector 200B, form the image projection system 1.

The second, fourth, and sixth embodiments will be described with reference to a case where three projectors 200, the first projector 200A to the third projector 200C, form the image projection system 1.

The present embodiment is not limited to the cases described above. The number of projectors 200 that form the image projection system 1 may be four or more.

In the following description, the projectors 200 refer to the first projector 200A and the second projector 200B in the first, third, and fifth embodiments. Further, the projectors 200 refer to the first projector 200A to the third projector 200C in the second, fourth, and sixth embodiments.

The control apparatus 100 sets the positions of images projected by the projectors 200 in such a way that the images projected by the projectors 200 are superimposed on one another. In other words, the images projected by the projectors 200 undergo the stack projection.

The projectors 200 each accept a user-s operation and adjust the position of the image projected by each of the projector 200 in accordance with the user-s operation. Specifically, the user adjusts the position of the image projected by each of the projectors 200, for example, by adjusting the position of the main body of each of the projector 200, adjusting lens shift, and adjusting zooming.

The control apparatus 100 switches the projection state of each of the projectors 200 between a projection-on state and a projection-off state. The projection-on state is a state in which an image is projected, and the projection-off state is a state in which no image is projected. In the projection-off state, the projectors 200 each display, for example, a solid black image.

The control apparatus 100 evaluates whether or not the projectors 200 each need to be adjusted. For example, the control apparatus 100 evaluates whether or not the color of an image projected by each of the projectors 200 needs to be adjusted.

The configuration of the control apparatus 100 will be described later with reference to FIGS. 3 and 5.

The control apparatus 100 corresponds to an example of an "image projection control apparatus."

In the present embodiment, the control apparatus 100 switches the projection state of each of the projectors 200 between the projection-on and the projection-off state and evaluates whether or not the color of an image projected by each of the projectors 200 needs to be adjusted, but not necessarily. For example, a second control section 250 of the first projector 200A, which will be described later with reference to FIG. 3, may switch the projection state of each of the projectors 200 between the projection-on state and the projection-off state and evaluate whether or not the color of an image projected by each of the projectors 200 needs to be adjusted.

Further, in the present embodiment, the projectors 200 are connected to each other via the network NW, and the projectors 200 may instead be connected to each other in accordance with daisy-chain connection. For example, the first projector 200A is connected to the second projector 200B via an HDMI (registered trademark) cable, and the second projector 200B is connected to the third projector 200C via an HDMI cable.

The projectors 200 may instead each be configured to be capable of wirelessly communicating with each other in accordance, for example, with the Wi-Fi (registered trademark) standard.

The camera 300 generates a captured image by capturing an image of a stacked image formed on a screen SC by the projectors 200 that project images in the stack projection.

The screen SC will be described later with reference to FIG. 2.

The present embodiment will be described with reference to a case where the camera 300 is a component separate from the projectors 200, but not necessarily. At least one of the projectors 200 may include a camera. For example, the second projector 200B may include a camera, and the camera of the second projector 200B may generate a captured image by capturing the stacked image formed on the screen SC.

Figure 2:
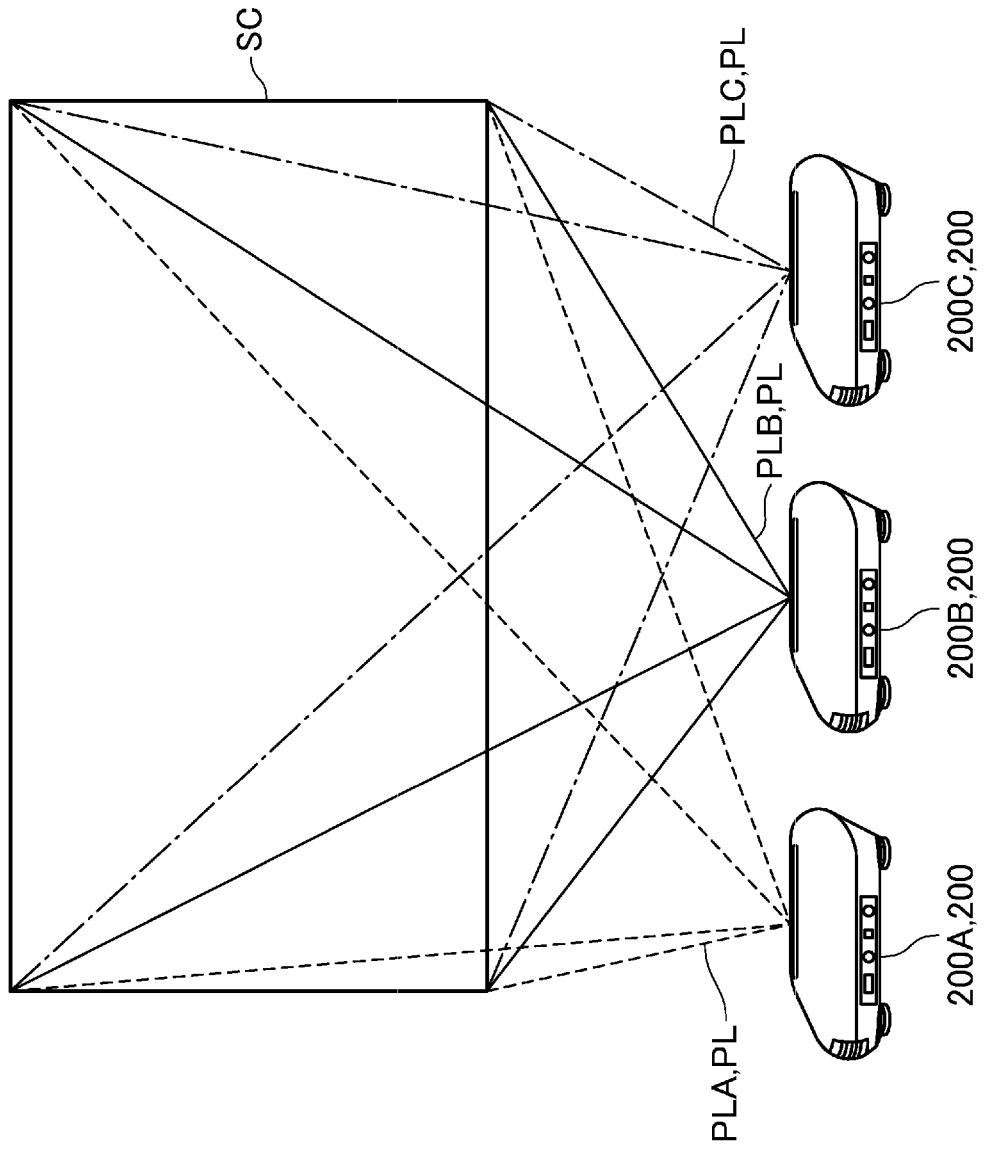
FIG. 2 is a perspective view showing an example of a projection state.

FIG. 2 is a perspective view showing an example of the projection states of the first projector 200A to the third projector 200C.

The first projector 200A to the third projector 200C are arranged, for example, in the rightward-leftward direction. In other words, the first projector 200A to the third projector 200C are arranged along the direction parallel to the screen SC.

The first projector 200A projects image light PLA on the screen SC. The second projector 200B projects image light PLB on the screen SC. The third projector 200C projects image light PLC on the screen SC.

The first projector 200A to the third projector 200C project the image light PLA to the image light PLC, respectively, in such a way that the image light PLA to the image light PLC are superimposed on one another on the screen SC.

The screen SC corresponds to an example of a "projection area."

The term "on the screen SC" corresponds to an example of the term "in a projection area."

When the image light PLA, the image light PLB, and the image light PLC are not distinguished from one another, they are called the image light PL in some cases.

Figure 3:
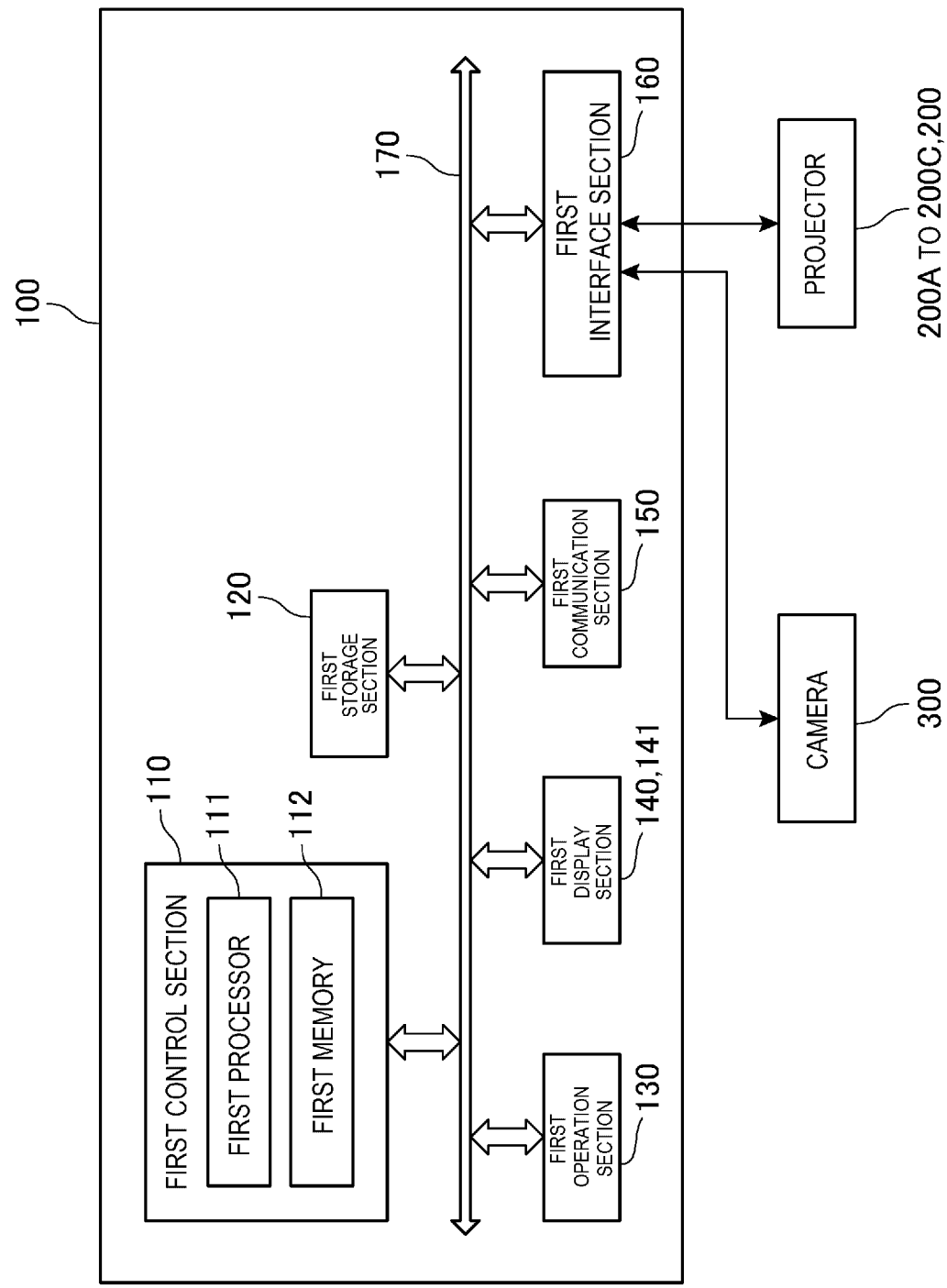
FIG. 3 shows an example of the configuration of a control apparatus according to the present embodiment.

FIG. 3 shows an example of the configuration of the control apparatus 100 according to the present embodiment.

The control apparatus 100 is communicably connected to the projectors 200 and the camera 300. The control apparatus 100 transmits data on an image to be projected on the screen SC, a variety of pieces of setting information, and a variety of pieces of instruction information to each of the projectors 200. In the present embodiment, the control apparatus 100 is communicably connected to the projectors 200 and the camera 300 via the network NW.

The data on an image to be projected on the screen SC represents, for example, an image generated when the control apparatus 100 reproduces a content. The image generated by reproducing a content is referred in some cases to as a "content image" in the following description. The data on an image to be projected on the screen SC is transmitted from the control apparatus 100 to each of the projectors 200.

In the present embodiment, the projectors 200 each project a content image on the screen SC, but not necessarily. The projectors 200 may each project, for example, a pattern image on the screen SC.

Further, in the present embodiment, the control apparatus 100 transmits data on an image to be projected on the screen SC to each of the projectors 200, but not necessarily. An image supplier that is not shown may transmit data on an image to be projected on the screen SC to each of the projectors 200. The image supplier is formed, for example, of a personal computer or a DVD player.

The control apparatus 100 is formed, for example, of a personal computer and includes a first control section 110, a first storage section 120, a first operation section 130, a first display section 140, a first communication section 150, and a first interface section 160.

The first storage section 120, the first operation section 130, the first display section 140, the first communication section 150, and the first interface section 160 are each connected to the first control section 110 via a first internal bus 170.

The first control section 110 includes a first processor 111 and a first memory 112, and controls each portion of the control apparatus 100.

The first memory 112 is a storage apparatus that stores in a nonvolatile manner a program executed by the first processor 111 and data processed by the first processor 111. The first memory 112 is formed of a magnetic storage apparatus, a semiconductor storage device, such as a flash ROM (read only memory), or any other type of nonvolatile storage apparatus.

The first memory 112 may include a RAM (random access memory) that forms a work area used by the first processor 111. The first memory 112 stores data processed by the first control section 110 and a first control program executed by the first processor 111.

The first processor 111 may be formed of a single processor, or a plurality of processors may function as the first processor 111. The first processor 111 executes the first control program to control each portion of the control apparatus 100.

The first storage section 120 stores in a nonvolatile manner a program executed by the first control section 110 and data processed by the first control section 110. The first storage section 120 is, for example, a magnetic recording apparatus, such as an HDD (hard disk drive), or a storage apparatus using a semiconductor storage device, such as a flash memory.

The first storage section 120 stores, for example, an operating system (OS) as a basic control program executed by the first control section 110 and an application program that operates on the OS as a platform. The first storage section 120 further stores, for example, data to be processed when the application program is executed and the processed data. The first storage section 120 still further stores the pattern images projected on the screen SC by the first projector 200A to the third projector 200C.

The first operation section 130 accepts the user-s operation, generates an operation signal, and outputs the operation signal to the first control section 110. The first operation section 130 includes, for example, a keyboard and a mouse.

The first display section 140 includes a display panel 141, which displays a variety of images under the control of the first control section 110. The display panel 141 includes, for example, an LCD (liquid crystal display). The display panel 141 is formed in a rectangular shape. In the present embodiment, the display panel 141 has an oblong shape.

In the present embodiment, the display panel 141 is configured as a touch panel. That is, the display panel 141 is provided with a touch sensor that detects the position where a pen, the user-s finger, or any other object comes into contact with the display panel 141.

The first communication section 150 is a communication interface that performs data communication with an external apparatus including the projectors 200 and the camera 300 and includes an interface circuit that processes signals to be transmitted and received. The first communication section 150 is, for example, a wireless communication interface corresponding to the Wi-Fi (registered trademark) standard.

The first interface section 160 is an interface communicably connected to the external apparatus including the projectors 200 and the camera 300. The first interface section 160 performs, for example, communication that complies with the Ethernet (registered trademark) standard. The first interface section 160 includes a connector to which an Ethernet (registered trademark) cable is connected and an interface circuit that processes a signal transmitted via the connector. The first interface section 160 is an interface substrate including the connector and the interface circuit and is connected to a main substrate of the first control section 110 that is a substrate on which the processor and other components are mounted. The connector and the interface circuit that form the first interface section 160 are instead mounted on a main substrate of the control apparatus 100.

In the present embodiment, the first control section 110 transmits a variety of pieces of image information, a variety of pieces of setting information, and a variety of pieces of instruction information to each of the projectors 200 and the camera 300 via the first interface section 160, but necessarily. The first control section 110 may instead transmit the variety of pieces of image information, the variety of pieces of setting information, and the variety of pieces of instruction information to each of the projectors 200 and the camera 300, for example, via the first communication section 150.

In other words, in the present embodiment, the first control section 110 transmits the variety of pieces of image information, the variety of pieces of setting information, and the variety of pieces of instruction information to each of the projectors 200 and the camera 300 by using wired communication, and the first control section 110 may instead transmit the variety of pieces of image information, the variety of pieces of setting information, and the variety of pieces of instruction information to each of the projectors 200 and the camera 300 by using wireless communication.

In the present embodiment, the control apparatus 100 is formed of a personal computer, and the control apparatus 100 may instead be formed, for example, of a tablet terminal or a smartphone.

Figure 4:
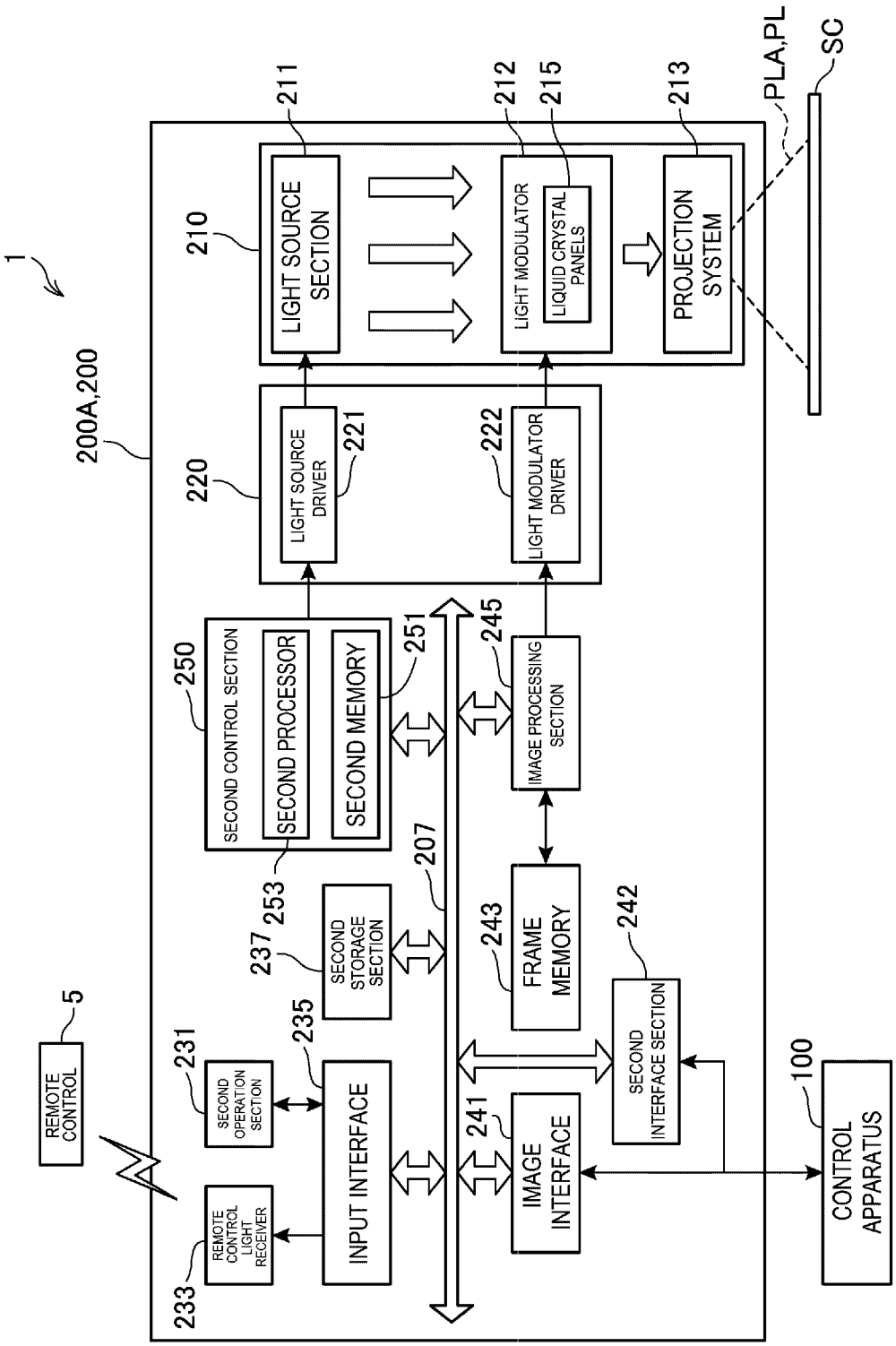
FIG. 4 shows an example of the configuration of a projector.

FIG. 4 shows an example of the configuration of the first projector 200A.

Since the first projector 200A to the third projector 200C have substantially the same configuration, the configuration of the first projector 200A will be described with reference to FIG. 4, and the configuration of each of the second projector 200B and the third projector 200C will not be described.

The first projector 200A includes a projection section 210 and a driver 220, which drives the projection section 210. The projection section 210 forms an optical image and projects the image on the screen SC. In the present embodiment, the projection section 210 projects the pattern image corresponding to the image data from the control apparatus 100 on the screen SC.

The projection section 210 includes a light source section 211, an optical modulator 212, and a projection system 213. The drive section 220 includes a light source driver 221 and a light modulator driver 222.

The light source section 211 includes a lamp, such as a halogen lamp, a xenon lamp, and an ultrahigh-pressure mercury lamp, or a solid-state light source, such as an LED (light emitting diode) and a laser light source.

The light source section 211 may include a reflector and an auxiliary reflector that guide the light outputted by the light source to the light modulator 212. The light source section 211 may further include, for example, the following optical elements for enhancing the optical characteristics of projection light: a lens group; a polarizer; and a light adjusting element that is disposed in the path to the light modulator 212 and attenuates the amount of light outputted by the light source.

The light source driver 221 is connected to a second internal bus 207 and turns on and off the light source of the light source section 211 in accordance with an instruction from the second control section 250 connected to the second internal bus 207.

The light modulator 212 includes, for example, three liquid crystal panels 215 corresponding to the three primary colors, R, G, and B. The characters R, G, and B represent red, green, and blue, respectively. That is, the light modulator 212 includes a liquid crystal panel 215 corresponding to the R light, a liquid crystal panel 215 corresponding to the G light, and a liquid crystal panel 215 corresponding to the B light.

The light outputted by the light source section 211 is separated into three color light fluxes or the R light, the G light, and the B light, which enter the liquid crystal panels 215 corresponding thereto. The three liquid crystal panels 215 are each a transmissive liquid crystal panel and each modulate the light flux passing therethrough to produce the image light PLA. The image light PLA having passed through the respective liquid crystal panels 215 and having therefore been modulated are combined with one another by a light combining system, such as a cross dichroic prism, and the combined image light PLA exits toward the projection system 213.

The present embodiment will be described with reference to the case where the light modulator 212 includes the transmissive liquid crystal panels 215 as light modulation devices, but not necessarily. The light modulation devices may each be a reflective liquid crystal panel or a digital micromirror device.

The light modulator 212 is driven by the light modulator driver 222. The light modulator driver 222 is connected to an image processing section 245.

Image data corresponding to the RGB primary colors are inputted from the image processing section 245 to the light modulator driver 222. The light modulator driver 222 converts the inputted image data into data signals suitable for the action of the liquid crystal panels 215. The light modulator driver 222 applies voltage to each pixel of each of the liquid crystal panels 215 based on the data signals as a result of the conversion to draw an image in each of the liquid crystal panels 215.

The projection system 213 includes a lens, a mirror, and other components that bring the incident image light PL into focus on the screen SC. The projection system 213 may further include, for example, a zoom mechanism that enlarges or reduces an image to be projected on the screen SC and a focus adjustment mechanism that performs focus adjustment.

The first projector 200A further includes a second operation section 231, a remote control light receiver 233, an input interface 235, a second storage section 237, an image interface 241, a second interface section 242, a frame memory 243, the image processing section 245, and the second control section 250. The input interface 235, the second storage section 237, the image interface 241, the second interface section 242, the image processing section 245, and the second control section 250 are connected to each other via the second internal bus 207 so as to be capable of data communication.

The second operation section 231 includes a variety of buttons and switches provided at the surface of the enclosure of the first projector 200A, generates an operation signal corresponding to operation performed on any of the buttons and switches, and outputs the generated operation signal to the input interface 235. The input interface 235 includes a circuit that outputs the operation signal inputted from the second operation section 231 to the second control section 250.

The remote control light receiver 233 receives an infrared signal transmitted from a remote control 5 and decodes the received infrared signal to generate an operation signal. The remote control light receiver 233 outputs the generated operation signal to the input interface 235. The input interface 235 outputs the operation signal inputted from the remote control light receiver 233 to the second control section 250.

The second storage section 237 is, for example, a magnetic recording apparatus, such as an HDD, or a storage apparatus using a semiconductor storage device, such as a flash memory. The second storage section 237 stores, for example, a program executed by the second control section 250, data processed by the second control section 250, and image data.

The image interface 241 includes a connector and an interface circuit and is configured to be connectable via a wire to the control apparatus 100, which supplies the first projector 200A with image data. The image interface 241 is, for example, a communication interface that performs communication with the control apparatus 100 in accordance with the Ethernet (registered trademark) standard. The image interface 241 receives the image data from the control apparatus 100. The image data represents a content image in the present embodiment.

The second interface section 242 is a communication interface that performs communication with the control apparatus 100 in accordance with the Ethernet (registered trademark) standard. The second interface section 242 includes a connector to which an Ethernet (registered trademark) cable is connected and an interface circuit that processes a signal transmitted via the connector. The second interface section 242 is an interface substrate including the connector and the interface circuit and is connected to a main substrate of the second control section 250 that is a substrate on which a second processor 253 and other components are mounted. The connector and the interface circuit that form the second interface section 242 are instead mounted on the main substrate of the second control section 250. The second interface section 242 receives, for example, the variety of pieces of setting information and the variety of pieces of instruction information from the control apparatus 100.

The second control section 250 includes a second memory 251 and the second processor 253.

The second memory 251 is a storage apparatus that stores a program executed by the second processor 253 and data processed by the second processor 253 in a nonvolatile manner. The second memory 251 is formed of a magnetic storage apparatus, a semiconductor storage device, such as a flash ROM, or any other nonvolatile storage apparatus. The second memory 251 may include a RAM that forms a work area used by the second processor 253. The second memory 251 stores data processed by the second control section 250 and a second control program executed by the second processor 253.

The second processor 253 may be formed of a single processor, or a plurality of processors may function as the second processor 253. The second processor 253 executes the second control program to control each portion of the first projector 200A. For example, the second processor 253 outputs an instruction of execution of image processing corresponding to operation accepted by the second operation section 231 or the remote control 5 and parameters used in the image processing to the image processing section 245. The parameters include, for example, a geometric correction parameter for correction of geometric distortion of an image to be projected on the screen SC. The second processor 253 further controls the light source driver 221 to control the operation of turning on and off the light source section 211 and adjust the luminance of the light from the light source section 211.

The image processing section 245 and the frame memory 243 can be formed, for example, of an integrated circuit. The integrated circuit includes an LSI, an ASIC (application specific integrated circuit), and a PLD (programmable logic device). The PLD includes, for example, an FPGA (field-programmable gate array). An analog circuit may form part of the configuration of the integrated circuit, or the combination of a processor and an integrated circuit may be used. The combination of a processor and an integrated circuit is called, for example, a microcontroller (MCU), a SoC (System-on-a-chip), a system LSI, and a chipset.

The image processing section 245 develops the image data inputted via the image interface 241 in the frame memory 243. The frame memory 243 includes a plurality of banks. The banks each have storage capacity that allows image data corresponding to one frame to be written to the bank. The frame memory 243 is formed, for example, of an SDRAM (synchronous dynamic random access memory).

The image processing section 245 performs image processing on the image data developed in the frame memory 243, for example, resolution conversion or resizing, distortion correction, shape correction, digital zooming, and image color tone and brightness adjustment.

The image processing section 245 converts an input frame frequency of the vertical sync signal into a drawing frequency and generates a vertical sync signal having the drawing frequency. The generated vertical sync signal is called an output sync signal. The image processing section 245 outputs the generated output sync signal to the light modulator driver 222.

Figure 5:
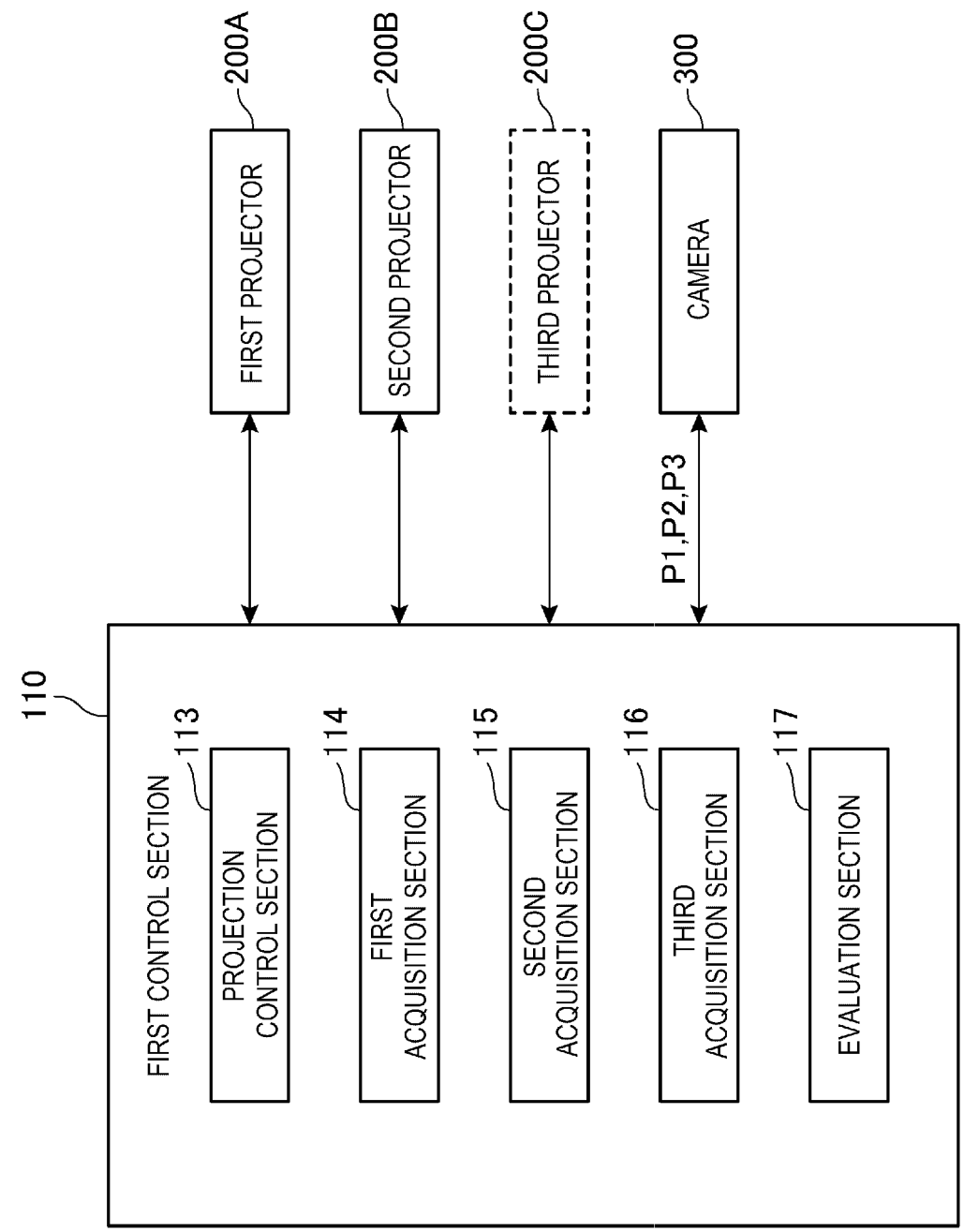
FIG. 5 shows an example of the configuration of a first control section of the control apparatus according to the present embodiment.

FIG. 5 shows an example of the configuration of the first control section 110 of the control apparatus 100 according to the present embodiment.

The first control section 110 of the control apparatus 100 includes a projection control section 113, a first acquisition section 114, a second acquisition section 115, a third acquisition section 116, and an evaluation section 117. Specifically, the first processor 111 of the first control section 110 executes the first control program stored in the first memory 112 to function as the projection control section 113, the first acquisition section 114, the second acquisition section 115, the third acquisition section 116, and the evaluation section 117.

The projection control section 113 causes the projection state of the first projector 200A at a second timing T2 to differ from the projection state of the first projector 200A at a first timing T1 and causes the projection state of each of the projectors 200 at a third timing T3 to be the same as the projection state of each of the projectors 200 at the first timing T1.

The projectors 200 refer to the first projector 200A and the second projector 200B in the first, third, and fifth embodiments. Further, the projectors 200 refer to the first projector 200A to the third projector 200C in the second, fourth, and sixth embodiments.

The second timing T2 occurs after the first timing T1, and the third timing T3 occurs after the second timing T2.

The projection state includes the projection-on state and the projection-off state. The projection-on state is a state in which a content image is projected, and the projection-off state is a state in which no content image is projected.

The projection control section 113 switches the projection state of each of the projectors 200 between the projection-on state and the projection-off state.

The first timing T1 to the third timing T3 will be described with reference to FIG. 6 and FIGS. 9 to 13.

The first acquisition section 114 acquires a first image P1 generated by the camera 300 when the camera 300 captures an image of an area containing the screen SC at the first timing T1.

Specifically, the first acquisition section 114 causes the camera 300 to capture an image of the area containing the screen SC at the first timing T1. The first acquisition section 114 then acquires the first image P1 generated by the camera 300.

The second acquisition section 115 acquires a second image P2 generated by the camera 300 when the camera 300 captures an image of the area containing the screen SC at the second timing T2.

Specifically, the second acquisition section 115 causes the camera 300 to capture an image of the area containing the screen SC at the second timing T2. The second acquisition section 115 then acquires the second image P2 generated by the camera 300.

The third acquisition section 116 acquires a third image P3 generated by the camera 300 when the camera 300 captures an image of the area containing the screen SC at the third timing T3.

Specifically, the third acquisition section 116 causes the camera 300 to capture an image of the area containing the screen SC at the third timing T3. The third acquisition section 116 then acquires the third image P3 generated by the camera 300.

The evaluation section 117 evaluates whether or not the first projector 200A needs to be adjusted based on the first image P1, the second image P2, and the third image P3.

Specifically, the evaluation section 117 determines that the first projector 200A needs to be adjusted when at least one of a first condition and a second condition shown below is satisfied. The evaluation section 117 determines that the first projector 200A does not need to be adjusted when the first or second condition is not satisfied.

The first condition is as follows: The difference between the first image P1 and the third image P3 is smaller than or equal to a first threshold S1 and the difference between the first image P1 and the second image P2 is greater than or equal to a second threshold S2.

The second condition is as follows: The difference between the first image P1 and the third image P3 is smaller than or equal to the first threshold S1 and the difference between the third image P3 and the second image P2 is greater than or equal to the second threshold S2.

To evaluate whether or not the first projector 200A needs to be adjusted, it is necessary to satisfy a condition that "the difference between the first image P1 and the third image P3 is smaller than or equal to the first threshold S1" contained in the first and second conditions. The condition that "the difference between the first image P1 and the third image P3 is smaller than or equal to the first threshold S1" indicates that a change in the content image is small in the period from the first timing T1 to the third timing T3.

To satisfy the condition that "the difference between the first image P1 and the third image P3 is smaller than or equal to the first threshold S1", the period from the first timing T1 to the third timing T3 is preferably short. In the present embodiment, the period from the first timing T1 to the third timing T3 is, for example, 100 msec.

The difference between the first image P1 and the third image P3 includes at least one of the difference in brightness between the first image P1 and the third image P3 and the difference in color value between the first image P1 and the third image P3.

The difference between the first image P1 and the second image P2 includes at least one of the difference in brightness between the first image P1 and the second image P2 and the difference in color value between the first image P1 and the second image P2.

The difference between the third image P3 and the second image P2 includes at least one of the difference in brightness between the third image P3 and the second image P2 and the difference in color value between the third image P3 and the second image P2.

The color value is, for example, a value representing "hue," which is one of the three attributes of color. The three attributes of color are formed of hue, brightness, and saturation.

For example, the difference in brightness between the first image P1 and the second image P2 is calculated as follows: First, a predetermined number of pixels that are two or more pixels that form the first image P1 are determined. The predetermined number is, for example, ten. The predetermined number of pixels that form the second image P2 are then so determined that the in-image positions of the pixels correspond to the in-image positions of the predetermined number of pixels that form the first image P1. The brightness of each of the predetermined number of pixels that form the first image P1 and the brightness of each of the predetermined number of pixels that form the second image P2 are then acquired. The differences in brightness between the predetermined number of pixels that form the first image P1 and the predetermined number of pixels that form the second image P2 and correspond to the predetermined number of pixels that form the first image P1 in terms of in-image position are then calculated, and the average of the differences in brightness is calculated. As a result, the difference in brightness between the first image P1 and the second image P2 is calculated.

The difference in color value between the first image P1 and the second image P2 is calculated, for example, as follows: First, a predetermined number of pixels that are two or more pixels that form the first image P1 are determined. The predetermined number is, for example, ten. The predetermined number of pixels that form the second image P2 are then so determined that the in-image positions of the pixels correspond to the in-image positions of the predetermined number of pixels that form the first image P1. The color value of each of the predetermined number of pixels that form the first image P1 and the color value of each of the predetermined number of pixels that form the second image P2 are then acquired. The differences in color value between the predetermined number of pixels that form the first image P1 and the predetermined number of pixels that form the second image P2 and correspond to the predetermined number of pixels that form the first image P1 in terms of in-image position are then calculated, and the average of the differences in color value is calculated. As a result, the difference in color value between the first image P1 and the second image P2 is calculated.

The present embodiment will be described with reference to a case where the difference in color value between the first image P1 and the third image P3 is calculated as the difference between the first image P1 and the third image P3. In the following description, the difference in color value between the first image P1 and the third image P3 is called a "first color value difference" in some cases. As the difference between the first image P1 and the third image P3, the difference in brightness between the first image P1 and the third image P3 may be calculated. Further, as the difference between the first image P1 and the third image P3, the differences in brightness and color value between the first image P1 and the third image P3 may be calculated.

That is, in the present embodiment, the evaluation section 117 determines that the first projector 200A needs to be adjusted when at least one of a first condition and a second condition shown below is satisfied. The evaluation section 117 determines that the first projector 200A does not need to be adjusted when the first or second condition is not satisfied.

The first condition is as follows: A first color value difference C1, which is the difference in color value between the first image P1 and the third image P3, is smaller than or equal to a fourth threshold S4 and a second color value difference C2, which is the difference in color value between the first image P1 and the second image P2, is greater than or equal to a third threshold S3.

The second condition is as follows: The first color value difference C1, which is the difference in color value between the first image P1 and the third image P3, is smaller than or equal to the fourth threshold value S4 and a third color value difference C3, which is the difference in color value between the third image P3 and the second image P2, is greater than or equal to the third threshold value S3.

The fourth threshold S4 corresponds to an example of the first threshold S1, and the third threshold S3 corresponds to an example of the second threshold S2.

First Embodiment

Processes carried out by the first control section 110 according to the first embodiment will next be described with reference to FIGS. 6 to 8.

Figure 6:
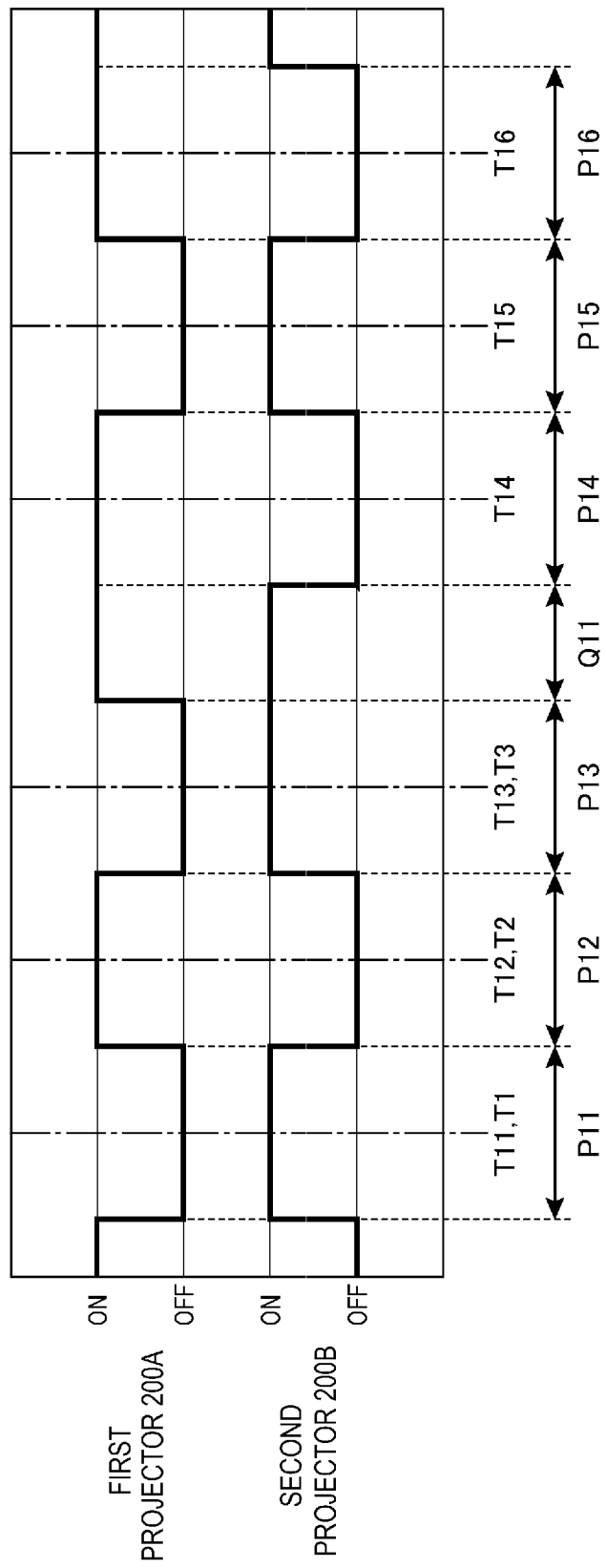
FIG. 6 is a timing chart showing an example of changes in a projection state in the first embodiment.

FIG. 6 is a timing chart showing an example of changes in the projection state in the first embodiment. The horizontal axis of FIG. 6 represents time, and the vertical axis of FIG. 6 represents the states of the first projector 200A to the third projector 200C. "ON" represents the projection-on state, and "OFF" represents the projection-off state.

The projection control section 113 of the first control section 110 switches the projection state of each of the first projector 200A and the second projector 200B between the projection-on state and the projection-off state, as will be described below with reference to FIG. 6.

In a period P11, the first projector 200A operates in the projection-off state, and the second projector 200B operates in the projection-on state.

In a period P12, the first projector 200A operates in the projection-on state, and the second projector 200B operates in the projection-off state.

In a period P13, the first projector 200A operates in the projection-off state, and the second projector 200B operates in the projection-on state.

A timing T11 represents the timing at the center of the period P11, a timing T12 represents the timing at the center of the period P12, and a timing T13 represents the timing at the center of the period P13. The first acquisition section 114 acquires the first image P1 at the timing T11. The second acquisition section 115 acquires the second image P2 at the timing T12. The third acquisition section 116 acquires the third image P3 at the timing T13.

The timing T11 corresponds to an example of the first timing T1, the timing T12 corresponds to an example of the second timing T2, and the timing T13 corresponds to an example of the third timing T3.

In the present embodiment, the timing T11 represents the timing at the center of the period P11, the timing T12 represents the timing at the center of the period P12, and the timing T13 represents the timing at the center of the period P13, but not necessarily. The timing T11 only needs to be any timing within the period P11. The timing T12 only needs to be any timing within the period P12. The timing T13 only needs to be any timing within the period P13.

The evaluation section 117 determines that the first projector 200A needs to be adjusted when the first image P1 acquired at the timing T11, the second image P2 acquired at the timing T12, and the third image P3 acquired at the timing T13 satisfy at least one of the first and second conditions shown below. The evaluation section 117 determines that the first projector 200A does not need to be adjusted when the first image P1 acquired at the timing T11, the second image P2 acquired at the timing T12, and the third image P3 acquired at the timing T13 satisfy neither the first condition nor the second condition shown below.

The first condition is as follows: The first color value difference C1, which is the difference in color value between the first image P1 and the third image P3, is smaller than or equal to the fourth threshold S4 and the second color value difference C2, which is the difference in color value between the first image P1 and the second image P2, is greater than or equal to the third threshold S3.

The second condition is as follows: The first color value difference C1, which is the difference in color value between the first image P1 and the third image P3, is smaller than or equal to the fourth threshold value S4 and the third color value difference C3, which is the difference in color value between the third image P3 and the second image P2, is greater than or equal to the third threshold value S3.

In a period Q11, the first projector 200A and the second projector 200B each operate in the projection-on state.

In FIG. 6, the length of the period Q11 is so drawn for convenience as to be shorter than the length of each of the periods P11 and P12, but not necessarily. It is preferable that the length of the period Q11 is longer than the length of each of the periods P11 and P12. The longer the length of the period Q11 is than the length of each of the periods P11 and P12, the more difficult it is for the user to visually recognize a change in the content image. In other words, deterioration in the quality of the content image due to the projection-off state of each of the projectors 200 can be suppressed. For example, the periods P11 and P12 each have a length of 100 msec, and the period Q11 has a length of 1 sec.

In a period P14, the first projector 200A operates in the projection-on state, and the second projector 200B operates in the projection-off state.

In a period P15, the first projector 200A operates in the projection-off state, and the second projector 200B operates in the projection-on state.

In a period P16, the first projector 200A operates in the projection-on state, and the second projector 200B operates in the projection-off state.

A timing T14 represents the timing at the center of the period P14, a timing 115 represents the timing at the center of the period P15, and a timing T16 represents the timing at the center of the period P16. The first acquisition section 114 acquires the first image P1 at the timing T14. The second acquisition section 115 acquires the second image P2 at the timing T15. The third acquisition section 116 acquires the third image P3 at the timing T16.

The evaluation section 117 determines that the second projector 200B needs to be adjusted when the first image P1 acquired at the timing T14, the second image P2 acquired at the timing T15, and the third image P3 acquired at the timing T16 satisfy at least one of the first and second conditions shown below. The evaluation section 117 determines that the second projector 200B does not need to be adjusted when the first image P1 acquired at the timing T14, the second image P2 acquired at the timing T15, and the third image P3 acquired at the timing T16 satisfy neither the first condition nor the second condition shown below.

The first condition is as follows: The first color value difference C1, which is the difference in color value between the first image P1 and the third image P3, is smaller than or equal to the fourth threshold S4 and the second color value difference C2, which is the difference in color value between the first image P1 and the second image P2, is greater than or equal to the third threshold S3.

The second condition is as follows: The first color value difference C1, which is the difference in color value between the first image P1 and the third image P3, is smaller than or equal to the fourth threshold value S4 and the third color value difference C3, which is the difference in color value between the third image P3 and the second image P2, is greater than or equal to the third threshold value S3.

Figure 7:
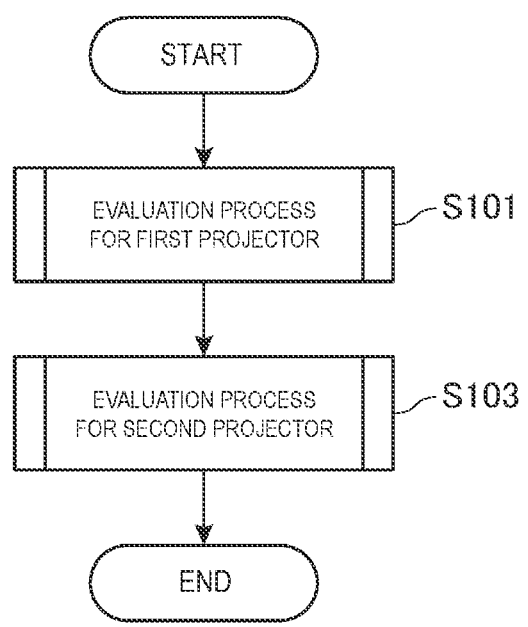
FIG. 7 is a flowchart showing an example of the overall process carried out by the first control section.

FIG. 7 is a flowchart showing an example of the overall process carried out by the first control section 110.

In step S101, the first control section 110 carries out an evaluation process for the first projector 200A.

In step S103, the first control section 110 carries out the evaluation process for the second projector 200B. The processes are then terminated.

The "evaluation process" is the process of evaluating whether or not the projector 200 under evaluation needs to be adjusted. The projector 200 under evaluation represents a projector 200 that is the target of the evaluation. The projector 200 under evaluation is the first projector 200A in step S101, and the projector 200 under evaluation is the second projector 200B in step S103.

The "evaluation process" will be described with reference to FIG. 8.

Figure 8:
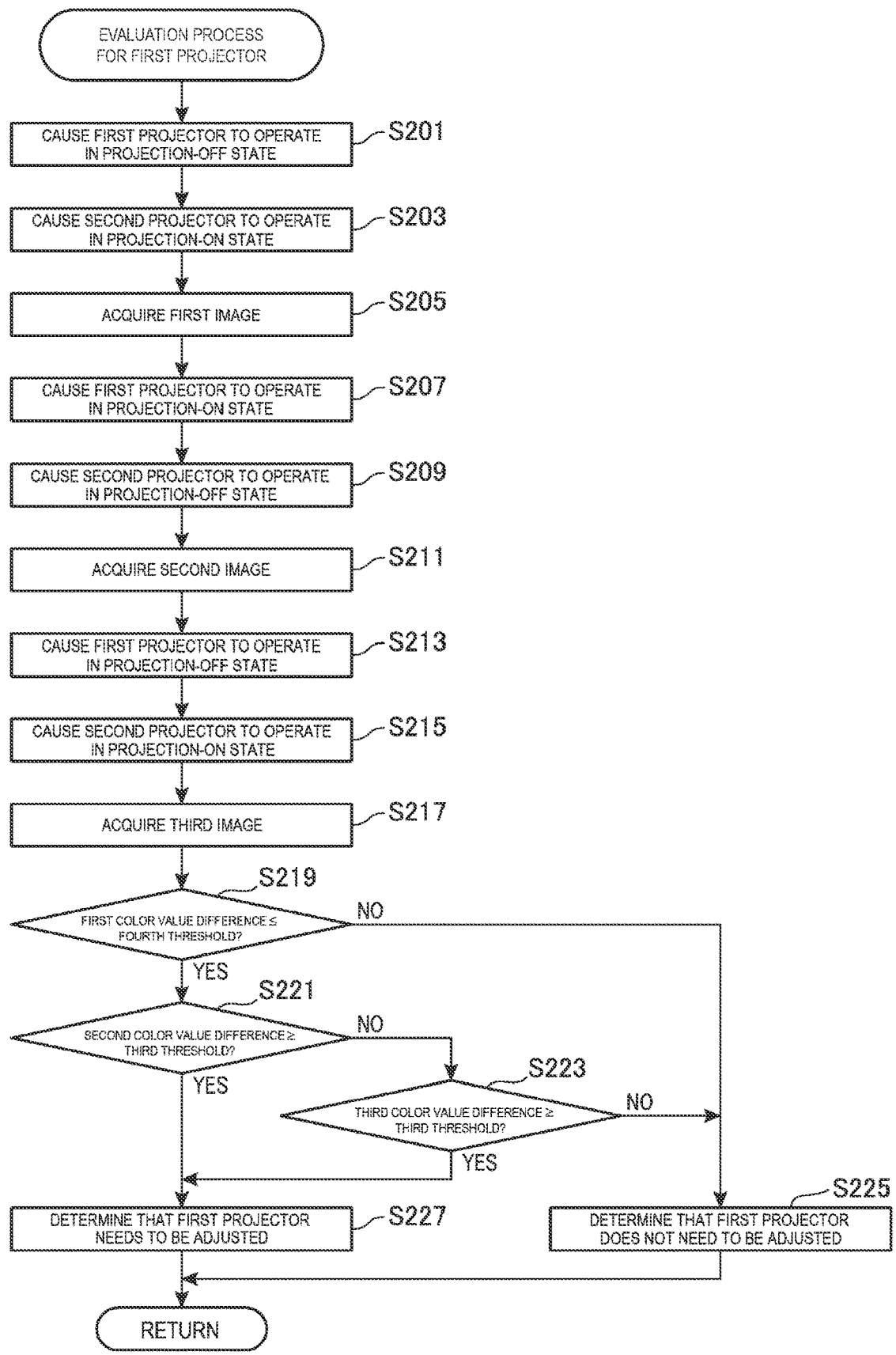
FIG. 8 is a flowchart showing an example of an evaluation process carried out by the first control section.

FIG. 8 is a flowchart showing an example of the evaluation process carried out by the first control section 110. FIG. 8 shows, as an example of the "evaluation process", the evaluation process for the first projector 200A carried out in step S101 of FIG. 7.

First, in step S201, the projection control section 113 causes the first projector 200A to operate in the projection-off state.

Thereafter, in step S203, the projection control section 113 causes the second projector 200B to operate in the projection-on state.

Thereafter, in step S205, the first acquisition section 114 causes the camera 300 to capture an image of the area containing the screen SC to acquire a generated first image P1.

Thereafter, in step S207, the projection control section 113 causes the first projector 200A to operate in the projection-on state.

Thereafter, in step S209, the projection control section 113 causes the second projector 200B to operate in the projection-off state.

Thereafter, in step S211, the second acquisition section 115 causes the camera 300 to capture an image of the area containing the screen SC to acquire a generated second image P2.

Thereafter, in step S213, the projection control section 113 causes the first projector 200A to operate in the projection-off state.

Thereafter, in step S215, the projection control section 113 causes the second projector 200B to operate in the projection-on state.

Thereafter, in step S217, the third acquisition section 116 causes the camera 300 to capture an image of the area containing the screen SC to acquire a generated third image P3.

Thereafter, in step S219, the evaluation section 117 calculates the first color value difference C1, which is the difference in color value between the first image P1 and the third image P3, and evaluates whether or not the first color value difference C1 is smaller than or equal to the fourth threshold S4.

When the evaluation section 117 determines that the first color value difference C1 is not smaller than or equal to the fourth threshold S4 (NO in step S219), the evaluation section 117 proceeds to the process in step S225. When the evaluation section 117 determines that the first color value difference C1 is smaller than or equal to the fourth threshold S4 (YES in step S219), the evaluation section 117 proceeds to the process in step S221.

Thereafter, in step S221, the evaluation section 117 calculates the second color value difference C2, which is the difference in color value between the first image P1 and the second image P2, and evaluates whether or not the second color value difference C2 is greater than or equal to the third threshold S3.

When the evaluation section 117 determines that the second color value difference C2 is greater than or equal to the third threshold S3 (YES in step S221), the evaluation section 117 proceeds to the process in step S227. When the evaluation section 117 determines that the second color value difference C2 is not greater than or equal to the third threshold S3 (NO in step S221), the evaluation section 117 proceeds to the process in step S223.

Thereafter, in step S223, the evaluation section 117 calculates the third color value difference C3, which is the difference in color value between the third image P3 and the second image P2, and evaluates whether or not the third color value difference C3 is greater than or equal to the third threshold S3.

When the evaluation section 117 determines that the third color value difference C3 is not greater than or equal to the third threshold S3 (NO in step S223), the evaluation section 117 proceeds to the process in step S225.

Thereafter, in step S225, the evaluation section 117 determines that the first projector 200A does not need to be adjusted. The evaluation section 117 then returns to the process in step S103 in FIG. 7.

When the evaluation section 117 determines that the third color value difference C3 is greater than or equal to the third threshold S3 (YES in step S223), the evaluation section 117 proceeds to the process in step S227.

Thereafter, in step S227, the evaluation section 117 determines that the first projector 200A needs to be adjusted. The evaluation section 117 then returns to the process in step S103 in FIG. 7.

In FIG. 8, the evaluation process for the first projector 200A is shown as an example of the "evaluation process," and the evaluation process for the second projector 200B is also similar to that in FIG. 8.

The evaluation process for the second projector 200B differs from that in the flowchart shown in FIG. 8 in terms of points below.

As shown in the period P14 in FIG. 6, the projection control section 113 causes the first projector 200A to operate in the projection-on state and causes the second projector 200B to operate in the projection-off state. The first acquisition section 114 then causes the camera 300 to capture an image of the area containing the screen SC to acquire a generated first image P1.

As shown in the period P15 in FIG. 6, the projection control section 113 causes the first projector 200A to operate in the projection-off state and causes the second projector 200B to operate in the projection-on state. The second acquisition section 115 then causes the camera 300 to capture an image of the area containing the screen SC to acquire a generated second image P2.

As shown in the period P16 in FIG. 6, the projection control section 113 causes the first projector 200A to operate in the projection-on state and causes the second projector 200B to operate in the projection-off state. The third acquisition section 116 then causes the camera 300 to capture an image of the area containing the screen SC to acquire a generated third image P3.

As described with reference to FIGS. 6 to 8, even when the first projector 200A and the second projector 200B each project a content image, whether or not the first projector 200A and the second projector 200B each need to be adjusted can be evaluated based on the first image P1, the second image P2, and the third image P3.

In the present embodiment, the first projector 200A operates in the projection-off state and the second projector 200B operates in the projection-on execution state in the period P11, the first projector 200A operates in the projection-on state and the second projector 200B operates in the projection-off state in the period P12, and the first projector 200A operates in the projection-off state and the second projector 200B operates in the projection-on state in the period P13, but not necessarily.

The projection states of the first projector 200A and the second projector 200B at the third timing may be caused to be the same as the projection states of the first projector 200A and the second projector 200B at the third timing, the projection state of the first projector 200A may be caused to differ from the projection state of the second projector 200B at least at one of the first and second timings, the first projector 200A may be caused to project a projection image at least at one of the first and second timings, and the second projector 200B may be caused to project a projection image at least at one of the first and second timings.

For example, when the first projector 200A operates in the projection-on state and the second projector 200B operates in the projection-off state in the period P11, the first projector 200A operates in the projection-off state and the second projector 200B operates in the projection-on state in the period P12, and the first projector 200A operates in the projection-on state and the second projector 200B operates in the projection-off state in the period P13, the evaluation process for the first projector 200A may be carried out based on the first image P1, the second image P2, and the third image P3.

Second Embodiment

The processes carried out by the first control section 110 according to a second embodiment will next be described with reference to FIG. 9.

Figure 9:
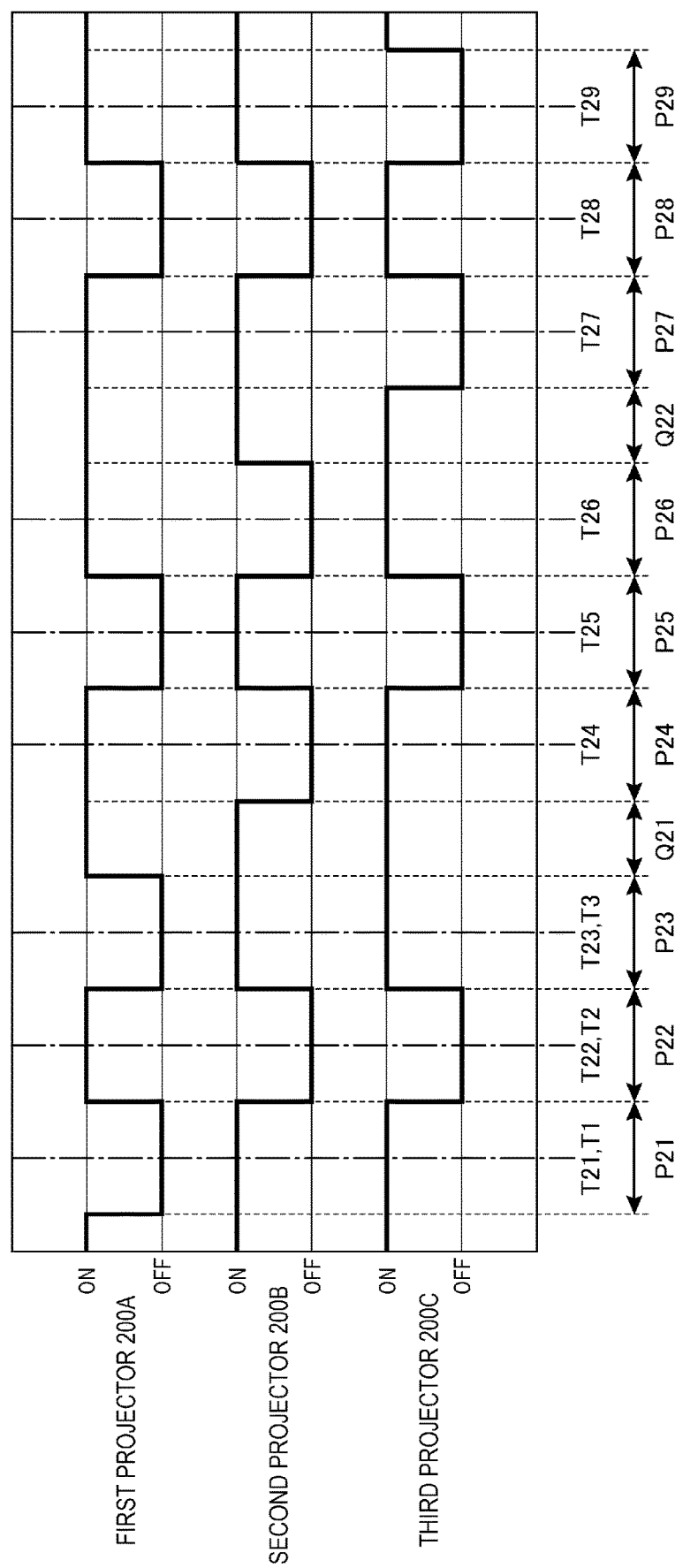
FIG. 9 is a timing chart showing an example of changes in the projection state in a second embodiment.

FIG. 9 is a timing chart showing an example of changes in the projection state in the second embodiment. The vertical and horizontal axes of FIG. 9 are the same as the vertical and horizontal axes shown in FIG. 6.

The projection control section 113 of the first control section 110 switches the projection state of each of the first projector 200A to the third projector 200C between the projection-on state and the projection-off state, as will be described below with reference to FIG. 9.

In a period P21, the first projector 200A operates in the projection-off state, and the projectors 200 excluding the first projector 200A, that is, the second projector 200B and the third projector 200C each operate in the projection-on state.

In a period P22, the first projector 200A operates in the projection-on state, and the projectors 200 excluding the first projector 200A, that is, the second projector 200B and the third projector 200C each operate in the projection-off state.

In a period P23, the first projector 200A operates in the projection-off state, and the projectors 200 excluding the first projector 200A, that is, the second projector 200B and the third projector 200C each operate in the projection-on state.

A timing T21 represents the timing at the center of the period P21, a timing T22 represents the timing at the center of the period P22, and a timing T23 represents the timing at the center of the period P23. The first acquisition section 114 acquires the first image P1 at the timing T21. The second acquisition section 115 acquires the second image P2 at the timing T22. The third acquisition section 116 acquires the third image P3 at the timing T23.

The timing T21 corresponds to an example of the first timing T1, the timing T22 corresponds to an example of the second timing T2, and the timing T23 corresponds to an example of the third timing T3.

The evaluation section 117 determines that the first projector 200A needs to be adjusted when the first image P1 acquired at the timing T21, the second image P2 acquired at the timing T22, and the third image P3 acquired at the timing T23 satisfy at least one of the first and second conditions described with reference to FIG. 6. The evaluation section 117 determines that the first projector 200A does not need to be adjusted when the first image P1 acquired at the timing T21, the second image P2 acquired at the timing T22, and the third image P3 acquired at the timing T23 satisfy neither the first condition nor the second condition described with reference to FIG. 6.

In a period Q21, the first projector 200A to the third projector 200C each operate in the projection-on state. The length of the period Q21 is preferably longer than the length of each of the periods P21 to P23, as in the case of the period Q11 shown in FIG. 6.

In a period P24, the second projector 200B operates in the projection-off state, and the projectors 200 excluding the second projector 200B, that is, the first projector 200A and the third projector 200C each operate in the projection-on state.

In a period P25, the second projector 200B operates in the projection-on state, and the projectors 200 excluding the second projector 200B, that is, the first projector 200A and the third projector 200C each operate in the projection-off state.

In a period P26, the second projector 200B operates in the projection-off state, and the projectors 200 excluding the second projector 200B, that is, the first projector 200A and the third projector 200C each operate in the projection-on state.

A timing T24 represents the timing at the center of the period P24, a timing T25 represents the timing at the center of the period P25, and a timing T26 represents the timing at the center of the period P26. The first acquisition section 114 acquires the first image P1 at the timing T24. The second acquisition section 115 acquires the second image P2 at the timing T25. The third acquisition section 116 acquires the third image P3 at the timing T26.

The evaluation section 117 determines that the second projector 200B needs to be adjusted when the first image P1 acquired at the timing T24, the second image P2 acquired at the timing T25, and the third image P3 acquired at the timing T26 satisfy at least one of the first and second conditions described with reference to FIG. 6. The evaluation section 117 determines that the second projector 200B does not need to be adjusted when the first image P1 acquired at the timing T24, the second image P2 acquired at the timing T25, and the third image P3 acquired at the timing T26 satisfy neither the first condition nor the second condition described with reference to FIG. 6.

In a period Q22, the first projector 200A to the third projector 200C each operate in the projection-on state. The length of the period Q22 is preferably longer than the length of each of the periods P24 to P26, as in the case of the period Q11 shown in FIG. 6.

In a period P27, the third projector 200C operates in the projection-off state, and the projectors 200 excluding the third projector 200C, that is, the first projector 200A and the second projector 200B each operate in the projection-on state.

In a period P28, the third projector 200C operates in the projection-on state, and the projectors 200 excluding the third projector 200C, that is, the first projector 200A and the second projector 200B each operate in the projection-off state.

In a period P29, the third projector 200C operates in the projection-off state, and the projectors 200 excluding the third projector 200C, that is, the first projector 200A and the second projector 200B each operate in the projection-on state.

A timing T27 represents the timing at the center of the period P27, a timing T28 represents the timing at the center of the period P28, and a timing T29 represents the timing at the center of the period P29. The first acquisition section 114 acquires the first image P1 at the timing T27. The second acquisition section 115 acquires the second image P2 at the timing T28. The third acquisition section 116 acquires the third image P3 at the timing T29.

The evaluation section 117 determines that the third projector 200C needs to be adjusted when the first image P1 acquired at the timing T27, the second image P2 acquired at the timing T28, and the third image P3 acquired at the timing T29 satisfy at least one of the first and second conditions described with reference to FIG. 6. The evaluation section 117 determines that the third projector 200C does not need to be adjusted when the first image P1 acquired at the timing T27, the second image P2 acquired at the timing T28, and the third image P3 acquired at the timing T29 satisfy neither the first condition nor the second condition described with reference to FIG. 6.

As described with reference to FIG. 9, even when the first projector 200A to the third projector 200C each project a content image, whether or not the first projector 200A to the third projector 200C each need to be adjusted can be evaluated based on the first image P1, the second image P2, and the third image P3.

Third Embodiment

The processes carried out by the first control section 110 according to a third embodiment will next be described with reference to FIG. 10.

Figure 10:
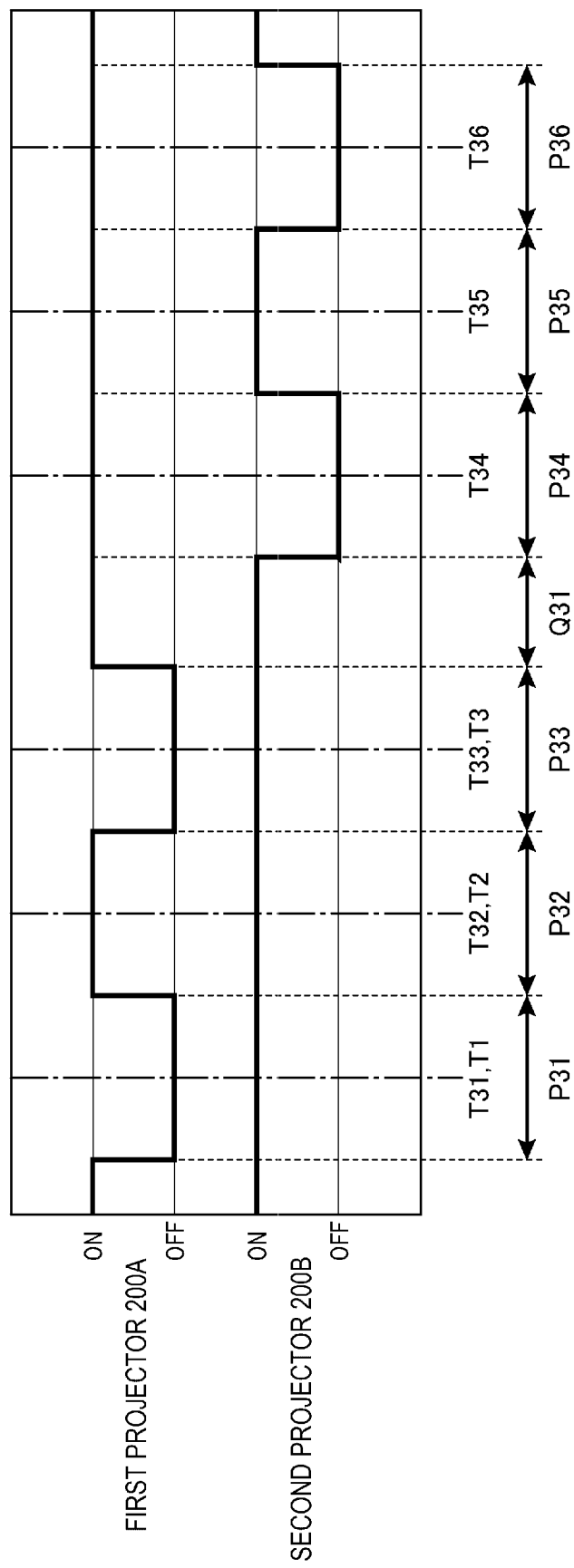
FIG. 10 is a timing chart showing an example of changes in the projection state in a third embodiment.

FIG. 10 is a timing chart showing an example of changes in the projection state in the third embodiment. The vertical and horizontal axes of FIG. 10 are the same as the vertical and horizontal axes shown in FIG. 6.

The projection control section 113 of the first control section 110 switches the projection state of each of the first projector 200A and the second projector 200B between the projection-on state and the projection-off state, as will be described below with reference to FIG. 10.

In the period P31, the first projector 200A operates in the projection-off state, and the second projector 200B operates in the projection-on state.

In a period P32, the first projector 200A and the second projector 200B each operate in the projection-on state.

In the period P33, the first projector 200A operates in the projection-off state, and the second projector 200B operates in the projection-on state.

A timing T31 represents the timing at the center of the period P31, a timing T32 represents the timing at the center of the period P32, and a timing T33 represents the timing at the center of the period P33. The first acquisition section 114 acquires the first image P1 at the timing T31. The second acquisition section 115 acquires the second image P2 at the timing T32. The third acquisition section 116 acquires the third image P3 at the timing T33.

The timing T31 corresponds to an example of the first timing T1, and the timing T32 corresponds to an example of the second timing T2. The timing T33 corresponds to an example of the third timing T3.

The evaluation section 117 determines that the first projector 200A needs to be adjusted when the first image P1 acquired at the timing T31, the second image P2 acquired at the timing T32, and the third image P3 acquired at the timing T33 satisfy at least one of the first and second conditions described with reference to FIG. 6. The evaluation section 117 determines that the first projector 200A does not need to be adjusted when the first image P1 acquired at the timing T31, the second image P2 acquired at the timing T32, and the third image P3 acquired at the timing T33 satisfy neither the first condition nor the second condition described with reference to FIG. 6.

In a period Q31, the first projector 200A and the second projector 200B each operate in the projection-on state.

The length of the period Q31 is also preferably longer than the length of each of the periods P31 to P33, as in the case of the period Q11 described with reference to FIG. 6.

In a period P34, the first projector 200A operates in the projection-on state, and the second projector 200B operates in the projection-off state.

In a period P35, the first projector 200A and the second projector 200B each operate in the projection-on state.

In a period P36, the first projector 200A operates in the projection-on state, and the second projector 200B operates in the projection-off state.

A timing T34 represents the timing at the center of the period P34, a timing T35 represents the timing at the center of the period P35, and a timing T36 represents the timing at the center of the period P36. The first acquisition section 114 acquires the first image P1 at the timing T34. The second acquisition section 115 acquires the second image P2 at the timing T35. The third acquisition section 116 acquires the third image P3 at the timing T36.

The evaluation section 117 determines that the second projector 200B needs to be adjusted when the first image P1 acquired at the timing T34, the second image P2 acquired at the timing T35, and the third image P3 acquired at the timing T36 satisfy at least one of the first and second conditions described with reference to FIG. 6. The evaluation section 117 determines that the second projector 200B does not need to be adjusted when the first image P1 acquired at the timing T34, the second image P2 acquired at the timing T35, and the third image P3 acquired at the timing T36 satisfy neither the first condition nor the second condition described with reference to FIG. 6.

As described with reference to FIG. 10, even when the first projector 200A and the second projector 200B each project a content image, whether or not the first projector 200A and the second projector 200B each need to be adjusted can be evaluated based on the first image P1, the second image P2, and the third image P3.

In the present embodiment, the first projector 200A operates in the projection-off state and the second projector 200B operates in the projection-on execution state in the period P31, the first projector 200A and the second projector 200B each operate in the projection-on state in the period P32, and the first projector 200A operates in the projection-off state and the second projector 200B operates in the projection-on state in the period P33, but not necessarily.

The projection states of the first projector 200A and the second projector 200B at the third timing may be caused to be the same as the projection states of the first projector 200A and the second projector 200B at the first timing, the projection state of the first projector 200A may be caused to differ from the projection state of the second projector 200B at least at one of the first and second timings, the first projector 200A may be caused to project a projection image at least at one of the first and second timings, and the second projector 200B may be caused to project a projection image at least at one of the first and second timings.

For example, when the projection state of the first projector 200A is caused to be the reverse of the projection state of the second projector 200B in the periods P31 and P33, the first projector 200A operates in the projection-on state and the second projector 200B operates in the projection-off state in the period P31, the first projector 200A and the second projector 200B operate in the projection-on state in the period P32, and the first projector 200A operates in the projection-on state and the second projector 200B operates in the projection-off state in the period P33, the evaluation process for the first projector 200A may be carried out based on the first image P1 the second image P2, and the third image P3.

Further, in the third embodiment shown in FIG. 10, since the period for which the first projector 200A and the second projector 200B each operate in the projection-off state is shorter than the period in the first embodiment shown in FIG. 6, deterioration in the quality of the content image due to the projection-off state of the projectors 200 can be suppressed.

Fourth Embodiment

The processes carried out by the first control section 110 according to a fourth embodiment will next be described with reference to FIG. 11.

Figure 11:
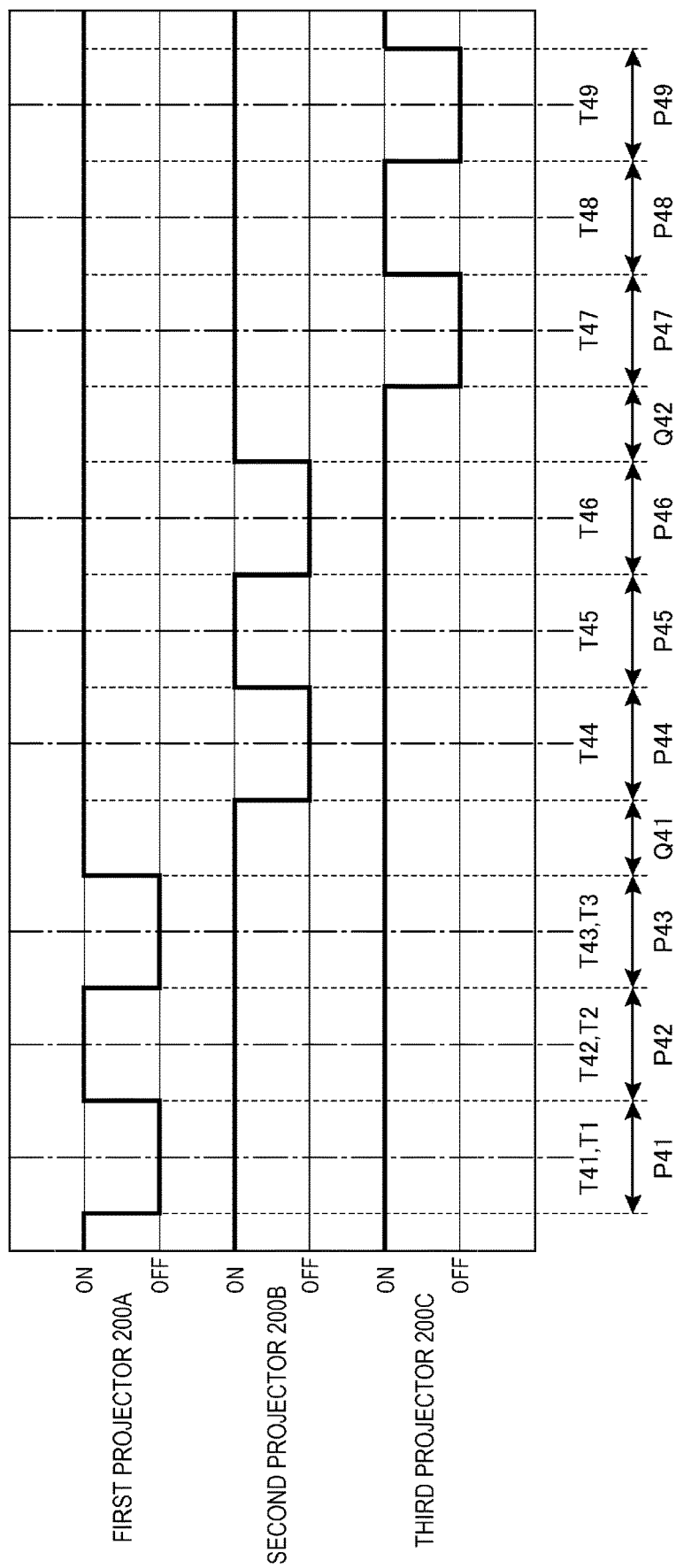
FIG. 11 is a timing chart showing an example of changes in the projection state in a fourth embodiment.

FIG. 11 is a timing chart showing an example of changes in the projection state in the fourth embodiment. The vertical and horizontal axes of FIG. 11 are the same as the vertical and horizontal axes shown in FIG. 6.

The projection control section 113 of the first control section 110 switches the projection state of each of the first projector 200A to the third projector 200C between the projection-on state and the projection-off state, as will be described below with reference to FIG. 11.

In a period P41, the first projector 200A operates in the projection-off state, and the projectors 200 excluding the first projector 200A, that is, the second projector 200B and the third projector 200C each operate in the projection-on state.

In a period P42, all the projectors 200, that is, the first projector 200A to the third projector 200C each operate in the projection-on state.

In a period P43, the first projector 200A operates in the projection-off state, and the projectors 200 excluding the first projector 200A, that is, the second projector 200B and the third projector 200C each operate in the projection-on state.

A timing T41 represents the timing at the center of the period P41, a timing T42 represents the timing at the center of the period P42, and a timing T43 represents the timing at the center of the period P43. The first acquisition section 114 acquires the first image P1 at the timing T41. The second acquisition section 115 acquires the second image P2 at the timing T42. The third acquisition section 116 acquires the third image P3 at the timing T43.

The timing T41 corresponds to an example of the first timing T1, the timing T42 corresponds to an example of the second timing T2, and the timing T43 corresponds to an example of the third timing T3.

The evaluation section 117 determines that the first projector 200A needs to be adjusted when the first image P1 acquired at the timing T41, the second image P2 acquired at the timing T42, and the third image P3 acquired at the timing T43 satisfy at least one of the first and second conditions described with reference to FIG. 6. The evaluation section 117 determines that the first projector 200A does not need to be adjusted when the first image P1 acquired at the timing T41, the second image P2 acquired at the timing T42, and the third image P3 acquired at the timing T43 satisfy neither the first condition nor the second condition described with reference to FIG. 6.

In a period Q41, the first projector 200A to the third projector 200C each operate in the projection-on state. The length of the period Q41 is preferably longer than the length of each of the periods P41 to P43, as in the case of the period Q11 shown in FIG. 6.

In a period P44, the second projector 200B operates in the projection-off state, and the projectors 200 excluding the second projector 200B, that is, the first projector 200A and the third projector 200C each operate in the projection-on state.

In a period P45, all the projectors 200, that is, the first projector 200A to the third projector 200C each operate in the projection-on state.

In a period P46, the second projector 200B operates in the projection-off state, and the projectors 200 excluding the second projector 200B, that is, the first projector 200A and the third projector 200C each operate in the projection-on state.

A timing T44 represents the timing at the center of the period P44, a timing T45 represents the timing at the center of the period P45, and a timing T46 represents the timing at the center of the period P46. The first acquisition section 114 acquires the first image P1 at the timing T44. The second acquisition section 115 acquires the second image P2 at the timing T45. The third acquisition section 116 acquires the third image P3 at the timing T46.

The evaluation section 117 determines that the second projector 200B needs to be adjusted when the first image P1 acquired at the timing T44, the second image P2 acquired at the timing T45, and the third image P3 acquired at the timing T46 satisfy at least one of the first and second conditions described with reference to FIG. 6. The evaluation section 117 determines that the second projector 200B does not need to be adjusted when the first image P1 acquired at the timing T44, the second image P2 acquired at the timing T45, and the third image P3 acquired at the timing T46 satisfy neither the first condition nor the second condition described with reference to FIG. 6.

In a period Q42, the first projector 200A to the third projector 200C each operate in the projection-on state. The length of the period Q42 is preferably longer than the length of each of the periods P44 to P46, as in the case of the period Q11 shown in FIG. 6.

In a period P47, the third projector 200C operates in the projection-off state, and the projectors 200 excluding the third projector 200C, that is, the first projector 200A and the second projector 200B each operate in the projection-on state.

In a period P48, all the projectors 200, that is, the first projector 200A to the third projector 200C each operate in the projection-on state.

In a period P49, the third projector 200C operates in the projection-off state, and the projectors 200 excluding the third projector 200C, that is, the first projector 200A and the second projector 200B each operate in the projection-on state.

A timing T47 represents the timing at the center of the period P47, a timing T48 represents the timing at the center of the period P48, and a timing T49 represents the timing at the center of the period P49. The first acquisition section 114 acquires the first image P1 at the timing T47. The second acquisition section 115 acquires the second image P2 at the timing T48. The third acquisition section 116 acquires the third image P3 at the timing T49.

The evaluation section 117 determines that the third projector 200C needs to be adjusted when the first image P1 acquired at the timing T47, the second image P2 acquired at the timing T48, and the third image P3 acquired at the timing T49 satisfy at least one of the first and second conditions described with reference to FIG. 6. The evaluation section 117 determines that the third projector 200C does not need to be adjusted when the first image P1 acquired at the timing T47, the second image P2 acquired at the timing T48, and the third image P3 acquired at the timing T49 satisfy neither the first condition nor the second condition described with reference to FIG. 6.

As described with reference to FIG. 11, even when the first projector 200A to the third projector 200C each project a content image, whether or not the first projector 200A to the third projector 200C each need to be adjusted can be evaluated based on the first image P1, the second image P2, and the third image P3.

Further, in the fourth embodiment shown in FIG. 11, since the period for which the first projector 200A to the third projector 200C each operate in the projection-off state is shorter than the period in the second embodiment shown in FIG. 9, deterioration in the quality of the content image due to the projection-off state of the projectors 200 can be suppressed.

Fifth Embodiment

The processes carried out by the first control section 110 according to a fifth embodiment will next be described with reference to FIG. 12.

Figure 12:
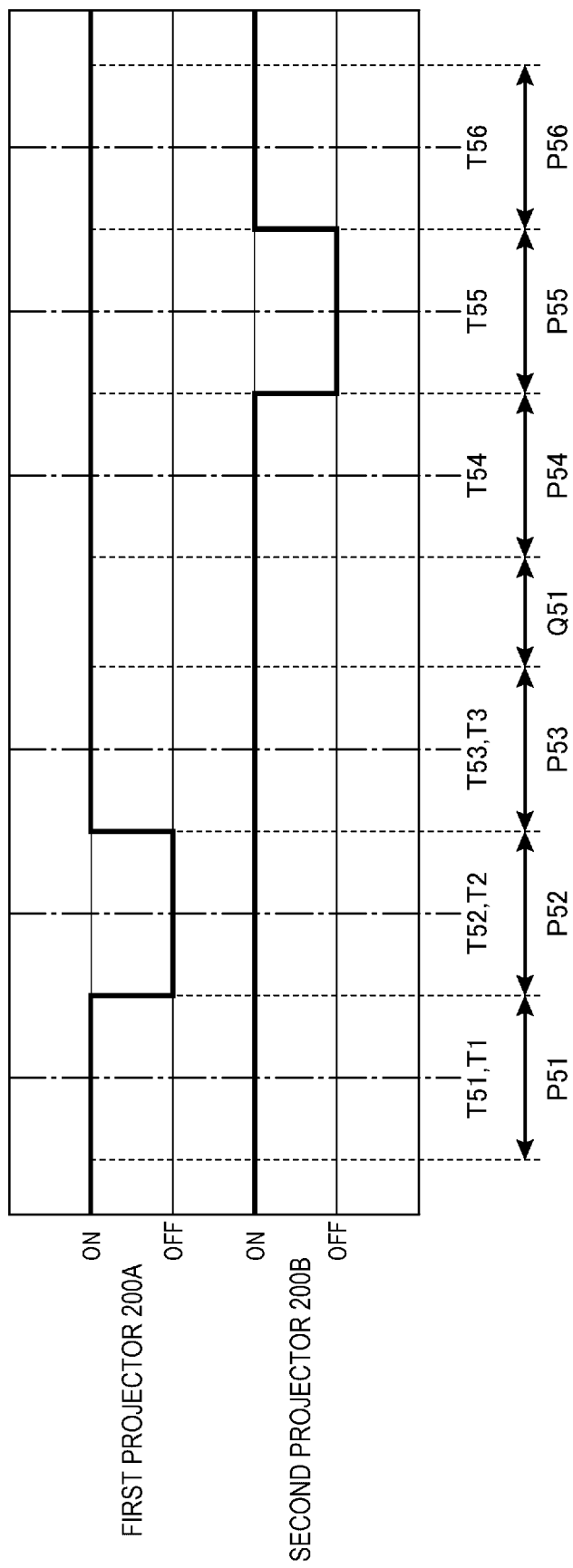
FIG. 12 is a timing chart showing an example of changes in the projection state in a fifth embodiment.

FIG. 12 is a timing chart showing an example of changes in the projection state in the fifth embodiment. The vertical and horizontal axes of FIG. 12 are the same as the vertical and horizontal axes shown in FIG. 6.

The projection control section 113 of the first control section 110 switches the projection state of each of the first projector 200A and the second projector 200B between the projection-on state and the projection-off state, as will be described below with reference to FIG. 12.

In a period P51, the first projector 200A and the second projector 200B each operate in the projection-on state.

In a period P52, the first projector 200A operates in the projection-off state, and the second projector 200B operates in the projection-on state.

In a period P53, the first projector 200A and the second projector 200B each operate in the projection-on state.

A timing T51 represents the timing at the center of the period P51, a timing T52 represents the timing at the center of the period P52, and a timing T53 represents the timing at the center of the period P53. The first acquisition section 114 acquires the first image P1 at the timing T51. The second acquisition section 115 acquires the second image P2 at the timing T52. The third acquisition section 116 acquires the third image P3 at the timing T53.

The timing T51 corresponds to an example of the first timing T1, and the timing T52 corresponds to an example of the second timing T2. The timing T53 corresponds to an example of the third timing T3.

The evaluation section 117 determines that the first projector 200A needs to be adjusted when the first image P1 acquired at the timing T51, the second image P2 acquired at the timing T52, and the third image P3 acquired at the timing T53 satisfy at least one of the first and second conditions described with reference to FIG. 6. The evaluation section 117 determines that the first projector 200A does not need to be adjusted when the first image P1 acquired at the timing T51, the second image P2 acquired at the timing T52, and the third image P3 acquired at the timing T53 satisfy neither the first condition nor the second condition described with reference to FIG. 6.

In a period Q51, the first projector 200A and the second projector 200B each operate in the projection-on state.

The length of the period Q51 is also preferably longer than the length of each of the periods P51 to P53, as in the case of the period Q11 described with reference to FIG. 6.

In a period P54, the first projector 200A and the second projector 200B each operate in the projection-on state.

In a period P55, the first projector 200A operates in the projection-on state, and the second projector 200B operates in the projection-off state.

In a period P56, the first projector 200A and the second projector 200B each operate in the projection-on state.

A timing T54 represents the timing at the center of the period P54, a timing T55 represents the timing at the center of the period P55, and a timing T56 represents the timing at the center of the period P56. The first acquisition section 114 acquires the first image P1 at the timing T54. The second acquisition section 115 acquires the second image P2 at the timing T55. The third acquisition section 116 acquires the third image P3 at the timing T56.

The evaluation section 117 determines that the second projector 200B needs to be adjusted when the first image P1 acquired at the timing T54, the second image P2 acquired at the timing T55, and the third image P3 acquired at the timing T56 satisfy at least one of the first and second conditions described with reference to FIG. 6. The evaluation section 117 determines that the second projector 200B does not need to be adjusted when the first image P1 acquired at the timing T54, the second image P2 acquired at the timing T55, and the third image P3 acquired at the timing T56 satisfy neither the first condition nor the second condition described with reference to FIG. 6.

As described with reference to FIG. 12, even when the first projector 200A and the second projector 200B each project a content image, whether or not the first projector 200A and the second projector 200B each need to be adjusted can be evaluated based on the first image P1, the second image P2, and the third image P3.

Further, in the fifth embodiment shown in FIG. 12, since the period for which the first projector 200A and the second projector 200B each operate in the projection-off state is shorter than the period in the first embodiment shown in FIG. 6 and the period in the third embodiment shown in FIG.

10, deterioration in the quality of the content image due to the projection-off state of the projectors 200 can be suppressed.

In the present embodiment, the first projector 200A and the second projector 200B each operate in the projection-on state in the period P51, the first projector 200A operates in the projection-off state and the second projector 200B operates in the projection-on state in the period P52, and the first projector 200A and the second projector 200B each operate in the projection-on state in the period P53, but not necessarily. The projection states of the first projector 200A and the second projector 200B at the third timing may be caused to be the same as the projection states of the first projector 200A and the second projector 200B at the first timing, the projection state of the first projector 200A may be caused to differ from the projection state of the second projector 200B at least at one of the first and second timings, the first projector 200A may be caused to project a projection image at least at one of the first and second timings, and the second projector 200B may be caused to project a projection image at least at one of the first and second timings.

For example, when the first projector 200A and the second projector 200B each operate in the projection-on state in the period P51, the first projector 200A operates in the projection-on state and the second projector 200B operates in the projection-off state in the period P52, and the first projector 200A and the second projector 200B each operate in the projection-on state in the period P53, the evaluation process for the first projector 200A may be carried out based on the first image P1, the second image P2, and the third image P3.

Sixth Embodiment

The processes carried out by the first control section 110 according to a sixth embodiment will next be described with reference to FIG. 13.

Figure 13:
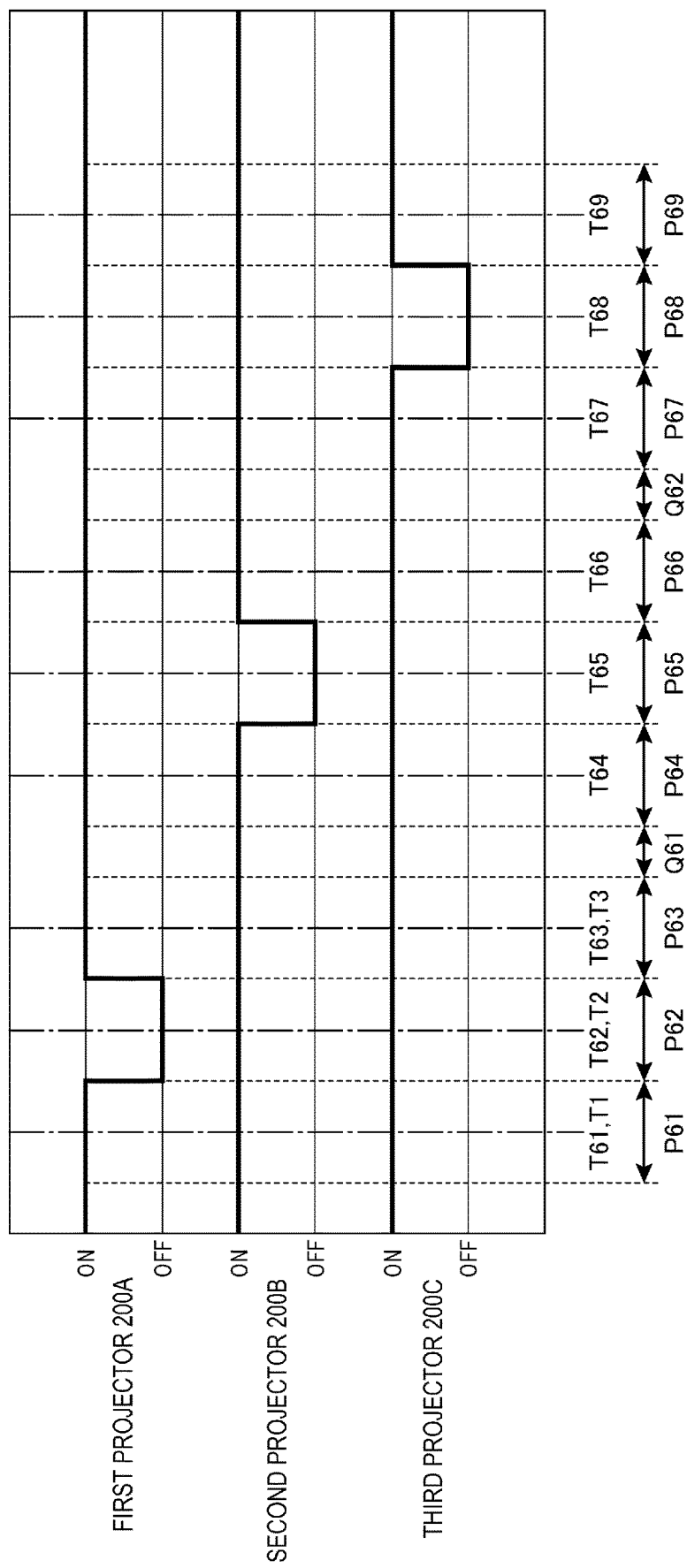
FIG. 13 is a timing chart showing an example of changes in the projection state in a sixth embodiment.

FIG. 13 is a timing chart showing an example of changes in the projection state in the sixth embodiment. The vertical and horizontal axes of FIG. 13 are the same as the vertical and horizontal axes shown in FIG. 6.

The projection control section 113 of the first control section 110 switches the projection state of each of the first projector 200A to the third projector 200C between the projection-on state and the projection-off state, as will be described below with reference to FIG. 13.

In a period P61, all the projectors 200, that is, the first projector 200A to the third projector 200C each operate in the projection-on state.

In a period P62, the first projector 200A operates in the projection-off state, and the projectors 200 excluding the first projector 200A, that is, the second projector 200B and the third projector 200C each operate in the projection-on state.

In a period P63, all the projectors 200, that is, the first projector 200A to the third projector 200C each operate in the projection-on state.

A timing T61 represents the timing at the center of the period P61, a timing T62 represents the timing at the center of the period P62, and a timing T63 represents the timing at the center of the period P63. The first acquisition section 114 acquires the first image P1 at the timing T61. The second acquisition section 115 acquires the second image P2 at the timing T62. The third acquisition section 116 acquires the third image P3 at the timing T63.

The timing T61 corresponds to an example of the first timing T1, the timing T62 corresponds to an example of the second timing T2, and the timing T63 corresponds to an example of the third timing T3.

The evaluation section 117 determines that the first projector 200A needs to be adjusted when the first image P1 acquired at the timing T61, the second image P2 acquired at the timing T62, and the third image P3 acquired at the timing T63 satisfy at least one of the first and second conditions described with reference to FIG. 6. The evaluation section 117 determines that the first projector 200A does not need to be adjusted when the first image P1 acquired at the timing T61, the second image P2 acquired at the timing T62, or the third image P3 acquired at the timing T63 satisfy neither the first condition nor the second condition described with reference to FIG. 6.

In a period Q61, the first projector 200A to the third projector 200C each operate in the projection-on state. The length of the period Q61 is preferably longer than the length of each of the period P61 to the period P63, as in the case of the period Q11 shown in FIG. 6.

In a period P64, all the projectors 200, that is, the first projector 200A to the third projector 200C each operate in the projection-on state.

In a period P65, the second projector 200B operates in the projection-off state, and the projectors 200 excluding the second projector 200B, that is, the first projector 200A and the third projector 200C each operate in the projection-on state.

In a period P66, all the projectors 200, that is, the first projector 200A to the third projector 200C each operate in the projection-on state.

A timing T64 represents the timing at the center of the period P64, a timing T65 represents the timing at the center of the period P65, and a timing T66 represents the timing at the center of the period P66. The first acquisition section 114 acquires the first image P1 at the timing T64. The second acquisition section 115 acquires the second image P2 at the timing T65. The third acquisition section 116 acquires the third image P3 at the timing T66.

The evaluation section 117 determines that the second projector 200B needs to be adjusted when the first image P1 acquired at the timing T64, the second image P2 acquired at the timing T65, and the third image P3 acquired at the timing T66 satisfy at least one of the first and second conditions described with reference to FIG. 6. The evaluation section 117 determines that the second projector 200B does not need to be adjusted when the first image P1 acquired at the timing T64, the second image P2 acquired at the timing T65, and the third image P3 acquired at the timing T66 satisfy neither the first condition nor the second condition described with reference to FIG. 6.

In a period Q62, the first projector 200A to the third projector 200C each operate in the projection-on state. The length of the period Q62 is preferably longer than the length of each of the period P64 to the period P66, as in the case of the period Q11 shown in FIG. 6.

In a period P67, all the projectors 200, that is, the first projector 200A to the third projector 200C each operate in the projection-on state.

In a period P68, the third projector 200C operates in the projection-off state, and the projectors 200 excluding the third projector 200C, that is, the first projector 200A and the second projector 200B each operate in the projection-on state.

In a period P69, all the projectors 200, that is, the first projector 200A to the third projector 200C each operate in the projection-on state.

A timing T67 represents the timing at the center of the period P67, a timing T68 represents the timing at the center of the period P68, and a timing T69 represents the timing at the center of the period P69. The first acquisition section 114 acquires the first image P1 at the timing T67. The second acquisition section 115 acquires the second image P2 at the timing T68. The third acquisition section 116 acquires the third image P3 at the timing T69.

The evaluation section 117 determines that the third projector 200C needs to be adjusted when the first image P1 acquired at the timing T67, the second image P2 acquired at the timing T68, and the third image P3 acquired at the timing T69 satisfy at least one of the first and second conditions described with reference to FIG. 6. The evaluation section 117 determines that the third projector 200C does not need to be adjusted when the first image P1 acquired at the timing T67, the second image P2 acquired at the timing T68, and the third image P3 acquired at the timing T69 satisfy neither the first condition nor the second condition described with reference to FIG. 6.

As described with reference to FIG. 13, even when the first projector 200A to the third projector 200C each project a content image, whether or not the first projector 200A to the third projector 200C each need to be adjusted can be evaluated based on the first image P1, the second image P2, and the third image P3.

Further, in the sixth embodiment shown in FIG. 13, since the period for which the first projector 200A to the third projector 200C each operate in the projection-off state is shorter than the period in the second embodiment shown in FIG. 9 and the period in the fourth embodiment shown in FIG. 11, deterioration in the quality of the content image due to the projection-off state of the projectors 200 can be suppressed.

Present Embodiment and Effects and Advantages

As described above with reference to FIGS. 1 to 13, the evaluation method for the image projection system 1 according to the present embodiment is the evaluation method for the image projection system 1, in which the first projector 200A and the second projector 200B perform the stack projection to project projection images on the screen SC, and includes acquiring the first image P1 generated by the camera 300 when the camera 300 captures an image of the area containing the screen SC at the first timing T1, acquiring the second image P2 generated by the camera 300 when the camera 300 captures an image of the area containing the screen SC at the second timing T2 after the first timing T1, acquiring the third image P3 generated by the camera 300 when the camera 300 captures an image of the area containing the screen SC at the third timing T3 after the second timing T2, causing the projection states of the first projector 200A and the second projector 200B at the timing T3 to be the same as the projection states of the first projector 200A and the second projector 200B at the first timing T1, causing the projection state of the first projector 200A to differ from the projection state of the second projector 200B at least at one of the first timing T1 and the second timing T2, causing the first projector 200A to project a projection image at least at one of the first timing T1 and the second timing T2, causing the second projector 200B to project a projection image at least at one of the first timing T1 and the second timing T2, and evaluating whether or not the first projector 200A needs to be adjusted based on the first image P1, the second image P2, and the third image P3.

Therefore, when the first projector 200A and the second projector 200B perform the stack projection, and even when the first projector 200A and the second projector 200B each project a content image, whether or not the first projector 200A needs to be adjusted can be evaluated.

In the evaluation method for the image projection system 1, when the difference between the first image P1 and the third image P3 is smaller than or equal to the first threshold S1 and the difference between the first image P1 and the second image P2 is greater than or equal to the second threshold S2, or when the difference between the first image P1 and the third image P3 is smaller than or equal to the first threshold S1 and the difference between the third image P3 and the second image P2 is greater than or equal to the second threshold S2, it is determined that the first projector 200A needs to be adjusted.

Therefore, when the first projector 200A and the second projector 200B projects content images in the stack projection, whether or not the first projector 200A needs to be adjusted can be properly evaluated.

In the evaluation method for the image projection system 1, the first projector 200A is not caused to project a projection image but the second projector 200B is caused to project a projection image at the first timing T1 and the third timing T3, and the first projector 200A is caused to project a projection image and the second projector 200B is not caused to project a projection image at the second timing T2, as described with reference to FIG. 6.

Therefore, the projection states of the first projector 200A and the second projector 200B at the third timing T3 can be caused to be the same as the projection states of the first projector 200A and the second projector 200B at the first timing T1, the first projector 200A can be caused to project a projection image at least at one of the first timing T1 and the second timing T2, and the second projector 200B can be caused to project a projection image at least at one of the first timing T1 and the second timing T2. Therefore, when the first projector 200A and the second projector 200B project content images in the stack projection, whether or not the first projector 200A needs to be adjusted can be properly evaluated.

In the evaluation method for the image projection system 1, the first projector 200A is not caused to project a projection image but the second projector 200B is caused to project a projection image at the first timing T1 and the third timing T3, the first projector 200A and the second projector 200B are each caused to project a projection image at the second timing T2, and when the difference between the first image P1 and the third image P3 is smaller than or equal to the first threshold S1 and the difference in color value between the first image P1 and the second image P2 is greater than or equal to the third threshold S3, or when the difference between the first image P1 and the third image P3 is smaller than or equal to the first threshold S1 and the difference in color value between the third image P3 and the second image P2 is greater than or equal to the third threshold S3, it is determined that the first projector 200A needs to be adjusted, as described with reference to FIG. 10.

Therefore, the projection state of the first projector 200A at the second timing T2 can be caused to differ from the projection state of the first projector 200A at the first timing T1, and the projection states of the first projector 200A and the second projector 200B at the third timing T3 can be caused to be the same as the projection states of the first projector 200A and the second projector 200B at the first timing T1. Therefore, when the first projector 200A and the second projector 200B projects content images in the stack projection, whether or not the first projector 200A needs to be adjusted can be properly evaluated.

The first image P1 and the third image P3 are images projected only by the second projector 200B, and the second image P2 is a stacked image of images projected by the first projector 200A and the second projector 200B. The first image P1 and the third image P3 each differ in brightness from the second image P2. The difference in brightness is therefore evaluated by the difference in color value between the first image P1 and the second image P2 and the difference in color value between the third image P3 and the second image P2. As described above, when the first image P1 and the third image P3 each differ in brightness from the second image P2, whether or not the first projector 200A needs to be adjusted can be properly evaluated by the evaluation in terms of the difference in color value.

Since the period for which the first projector 200A and the second projector 200B each operate in the projection-off state is shorter than the period in the form shown in FIG. 6, deterioration in the quality of the content image due to the projection-off state of each of the projectors 200 can be suppressed.

In the evaluation method for the image projection system 1, the first projector 200A and the second projector 200B are each caused to project a projection image at the first timing T1 and the third timing T3, the first projector 200A is not caused to project a projection image but the projector 200B is caused to project a projection image at the second timing T2, and when the difference between the first image P1 and the third image P3 is smaller than or equal to the first threshold S1 and the difference in color value between the first image P1 and the second image P2 is greater than or equal to the third threshold S3, or when the difference between the first image P1 and the third image P3 is smaller than or equal to the first threshold S1 and the difference in color value between the third image P3 and the second image P2 is greater than or equal to the third threshold S3, it is determined that the first projector 200A needs to be adjusted, as described with reference to FIG. 12.

Therefore, the projection state of the first projector 200A at the second timing T2 can be caused to differ from the projection state of the first projector 200A at the first timing T1, and the projection states of the first projector 200A and the second projector 200B at the third timing T3 can be caused to be the same as the projection states of the first projector 200A and the second projector 200B at the first timing T1. Therefore, when the first projector 200A and the second projector 200B projects content images in the stack projection, whether or not the first projector 200A needs to be adjusted can be properly evaluated.

Further, the first image P1 and the third image P3 forma stacked image of images projected by the first projector 200A and the second projector 200B, and the second image P2 is an image projected by only the second projector 200B. The first image P1 and the third image P3 thus differ in brightness from the second image P2. The difference in brightness is therefore evaluated by the difference in color value between the first image P1 and the second image P2 and the difference in color value between the third image P3 and the second image P2. As described above, when the first image P1 and the third image P3 each differ in brightness from the second image P2, whether or not the first projector 200A needs to be adjusted can be properly evaluated by the evaluation of the difference in color value.

Since the period for which the first projector 200A and the second projector 200B each operate in the projection-off state is shorter than the period in the forms shown in FIGS. 6 and 10, deterioration in the quality of the content image due to the projection-off state of each of the projectors 200 can be suppressed.

In the evaluation method for the image projection system. 1, the first projector 200A, the second projector 200B, and the third projector 200C perform the stack projection, and the projection state of the third projector 200C is caused to be the same as the projection state of the second projector 200B at the first timing T1, the second timing T2, and the third timing T3, as described with reference to FIGS. 9, 11, and 13.

Therefore, when the first projector 200A, the second projector 200B, and the third projector 200C perform the stack projection, and even when the first projector 200A, the second projector 200B, and the third projector 200C each project a content image, whether or not the first projector 200A needs to be adjusted can be evaluated.

In the evaluation method for the image projection system 1, the first projector 200A is not caused to project a projection image but the second projector 200B and the third projector 200C are each caused to project a projection image at the first timing T1 and the third timing T3, the first projector 200A is caused to project a projection image but the projector 200B or the third projector 200C is not caused to project a projection image at the second timing T2, and when the difference between the first image P1 and the third image P3 is smaller than or equal to the first threshold S1 and the difference between the first image P1 and the second image P2 is greater than or equal to the second threshold S2, or when the difference between the first image P1 and the third image P3 is smaller than or equal to the first threshold S1 and the difference between the third image P3 and the second image P2 is greater than or equal to the second threshold S2, it is determined that the first projector 200A needs to be adjusted, as described with reference to FIG. 9.

Therefore, when the first projector 200A to the third projector 200C perform the stack projection, the projection state of the third projector 200C can be caused to be the same as the projection state of the second projector 200B at the first timing T1, the second timing T2, and the third timing T3. Therefore, when the first projector 200A to the third projector 200C project content images in the stack projection, whether or not the first projector 200A needs to be adjusted can be properly evaluated.

In the evaluation method for the image projection system 1, the first projector 200A is not caused to project a projection image but the second projector 200B and the third projector 200C are each caused to project a projection image at the first timing T1 and the third timing T3, the first projector 200A, the second projector 200B, and the third projector 200C are each caused to project a projection image at the second timing T2, and when the difference between the first image P1 and the third image P3 is smaller than or equal to the first threshold S1 and the difference in color value between the first image P1 and the second image P2 is greater than or equal to the third threshold S3, or when the difference between the first image P1 and the third image P3 is smaller than or equal to the first threshold S1 and the difference in color value between the third image P3 and the second image P2 is greater than or equal to the third threshold S3, it is determined that the first projector 200A needs to be adjusted, as described with reference to FIG. 11.

Therefore, when the first projector 200A to the third projector 200C perform the stack projection, the projection state of the third projector 200C can be caused to be the same as the projection state of the second projector 200B at the first timing T1, the second timing T2, and the third timing T3. Therefore, when the first projector 200A to the third projector 200C project content images in the stack projection, whether or not the first projector 200A needs to be adjusted can be properly evaluated.

Since the period for which the first projector 200A to the third projector 200C each operate in the projection-off state is shorter than the period in the form shown in FIG. 9, deterioration in the quality of the content image due to the projection-off state of the projectors 200 can be suppressed.

In the evaluation method for the image projection system 1, the first projector 200A, the second projector 200B, and the third projector 200C are each caused to project a projection image at the first timing T1 and the third timing T3, the first projector 200A is not caused to project a projection image but the second projector 200B and the third projector 200C are each caused to project a projection image at the second timing T2, and when the difference between the first image P1 and the third image P3 is smaller than or equal to the first threshold S1 and the difference in color value between the first image P1 and the second image P2 is greater than or equal to the third threshold S3, or when the difference between the first image P1 and the third image P3 is smaller than or equal to the first threshold S1 and the difference in color value between the third image P3 and the second image P2 is greater than or equal to the third threshold S3, it is determined that the first projector 200A needs to be adjusted, as described with reference to FIG. 13.

Therefore, when the first projector 200A to the third projector 200C perform the stack projection, the projection state of the third projector 200C can be caused to be the same as the projection state of the second projector 200B at the first timing T1, the second timing T2, and the third timing T3. Therefore, when the first projector 200A to the third projector 200C project content images in the stack projection, whether or not the first projector 200A needs to be adjusted can be properly evaluated.

Since the period for which the first projector 200A to the third projector 200C each operate in the projection-off state is shorter than the period in the form shown in FIGS. 9 and 11, deterioration in the quality of the content image due to the projection-off state of the projectors 200 can be suppressed.

The image projection system 1 according to the present embodiment is the image projection system 1 including the first projector 200A, the second projector 200B, and the camera 300, which captures an image of projected images, and includes the first acquisition section 114, which acquires the first image P1 generated by the camera 300 when the camera 300 captures an image of the area containing the screen SC at the first timing T1, the second acquisition section 115, which acquires the second image P2 generated by the camera 300 when the camera 300 captures an image of the area containing the screen SC at the second timing T2 after the first timing T1, the third acquisition section 116, which acquires the third image P3 generated by the camera 300 when the camera 300 captures an image of the area containing the screen SC at the third timing T3 after the second timing T2, the projection control section 113, which causes the projection states of the first projector 200A and the second projector 200B at the timing T3 to be the same as the projection states of the first projector 200A and the second projector 200B at the first timing T1, causes the projection state of the first projector 200A to differ from the projection state of the second projector 200B at least at one of the first timing T1 and the second timing T2, causes the first projector 200A to project a projection image at least at one of the first timing T1 and the second timing T2, and causes the second projector 200B to project a projection image at least at one of the first timing T1 and the second timing T2, and the evaluation section 117, which evaluates whether or not the first projector 200A needs to be adjusted based on the first image P1, the second image P2, and the third image P3.

Therefore, when the first projector 200A and the second projector 200B perform the stack projection, and even when the first projector 200A and the second projector 200B each project a content image, whether or not the first projector 200A needs to be adjusted can be evaluated.

The control apparatus 100 according to the present embodiment is the control apparatus 100 communicably connected to the first projector 200A and the second projector 200B, which perform the stack projection, and the camera 300, which captures an image of projected images, and includes the first acquisition section 114, which acquires the first image P1 generated by the camera 300 when the camera 300 captures an image of the area containing the screen SC at the first timing T1, the second acquisition section 115, which acquires the second image P2 generated by the camera 300 when the camera 300 captures an image of the area containing the screen SC at the second timing T2 after the first timing T1, the third acquisition section 116, which acquires the third image P3 generated by the camera 300 when the camera 300 captures an image of the area containing the screen SC at the third timing T3 after the second timing T2, the projection control section 113, which causes the projection states of the first projector 200A and the second projector 200B at the timing T3 to be the same as the projection states of the first projector 200A and the second projector 200B at the first timing T1, causes the projection state of the first projector 200A to differ from the projection state of the second projector 200B at least at one of the first timing T1 and the second timing T2, causes the first projector 200A to project a projection image at least at one of the first timing T1 and the second timing T2, and causes the second projector 200B to project a projection image at least at one of the first timing T1 and the second timing T2, and the evaluation section 117, which evaluates whether or not the first projector 200A needs to be adjusted based on the first image P1, the second image P2, and the third image P3.

Therefore, when the first projector 200A and the second projector 200B perform the stack projection, and even when the first projector 200A and the second projector 200B each project a content image, whether or not the first projector 200A needs to be adjusted can be evaluated.

Other Embodiments

The present embodiment described above is a preferable embodiment. The present disclosure is, however, not limited to the present embodiment described above, and a variety of variations are conceivable to the extent that the variations do not depart from the substance of the present disclosure.

In the present embodiment, the case where the number of projectors 200 that perform the stack projection is two or three has been described in detail with reference to FIGS. 1 to 13, but not necessarily. The number of projectors 200 that perform the stack projection may be four or more.

In the present embodiment, the first control section 110 of the control apparatus 100 includes the projection control section 113, the first acquisition section 114, the second acquisition section 115, the third acquisition section 116, and the evaluation section 117, but not necessarily. Any one of the plurality of projectors 200 that form the image projection system 1 may include the projection control section 113, the first acquisition section 114, the second acquisition section 115, the third acquisition section 116, and the evaluation section 117. In this case, the image projection system 1 does not need to include the control apparatus 100.

In the present embodiment, the projection image is an image generated when the control apparatus 100 reproduces a content, that is, a "content image," but not necessarily. The projection image may be a pattern image.

The present embodiment has been described with reference to the case where the control apparatus 100 is formed of a personal computer, but not necessarily. The control apparatus 100 may instead be formed, for example, of a tablet terminal, a smartphone, a PDA (personal digital assistant).

Further, the present embodiment has been described with reference to the case where the control apparatus 100 is communicably connected to the projectors 200 via a LAN, but not necessarily. The control apparatus 100 may be communicably connected to the projectors 200 via wireless communication, such as Wi-Fi (registered trademark).

The functional portions shown in FIGS. 3 to 5 each represent a functional configuration and are each not necessarily implemented in a specific form. That is, hardware corresponding to each of the functional portions is not necessarily implemented, and a single processor that executes a program can, of course, achieve the functions of the plurality of functional portions. Further, part of the functions achieved by software in the embodiments described above may be achieved by hardware, or part of the functions achieved by hardware in the embodiments described above may be achieved by software. In addition, the specific detailed configuration of each of the other portions in the control apparatus 100 can be arbitrarily changed to the extent that the change does not depart from the substance of the present disclosure.

The process units in the flowcharts shown in FIG. 8 are process units divided in accordance with the contents of primary processes for easy understanding of the processes carried out by the control apparatus 100. The process units in the flowcharts shown in FIG. 8 are not limited by how to produce the divided process units or the names of the process. A process carried out by the control apparatus 100 can be further divided into a larger number of process units, and each of the process units can be further divided into a large number of processes in accordance with the content of the process. Further, the order in accordance with which the processes are carried out in the flowchart described above is not limited to those shown in FIG. 8.

Further, the evaluation method for the image projection system 1 can be achieved by causing the first processor 111 provided in the control apparatus 100 to execute the first control program corresponding to the evaluation method for the image projection system 1. The first control program can also be recorded on a computer readable recording medium. The recording medium can be a magnetic or optical recording medium or a semiconductor memory device. Specific examples of the recording medium may include a flexible disk, an HDD, a CD-ROM (compact disk read only memory), a DVD, a Blu-ray (registered trademark) Disc, a magneto-optical disk, a flash memory, a portable recording medium, such as a card-shaped recording medium, and an immobile recording medium. The recording medium may instead be a RAM, a ROM, an HDD, or any other nonvolatile storage apparatus that is an internal storage apparatus provided in an image processing apparatus. Further, the evaluation method for the image projection system 1 can be achieved by causing a server apparatus or any other apparatus to store the first control program corresponding to the evaluation method for the image projection system 1 and downloading the first control program from the server apparatus to the control apparatus 100.

What is claimed is:

1. An evaluation method for an image projection system the method comprising:
    acquiring a first image generated by capturing a projection area at a first timing;
    acquiring a second image generated by capturing the projection area at a second timing after the first timing;
    acquiring a third image generated by capturing the projection area at a third timing after the second timing;
    causing projection states of a first projector and a second projector at the third timing to be the same as the projection states of the first projector and the second projector at the first timing;
    causing the projection state of the first projector to differ from the projection state of the second projector at least one of the first timing or the second timing;
    causing the first projector to project the projection image at least one of the first timing or the second timing;
    causing the second projector to project the projection image at least one of the first timing or the second timing; and
    evaluating whether or not the first projector needs to be adjusted based on the first image, the second image, and the third image, wherein
    the first projector and the second projector perform stack projection in the projection area.

2. The evaluation method for an image projection system according to claim 1,
    wherein when a difference between the first image and the third image is smaller than or equal to a first threshold and a difference between the first image and the second image is greater than or equal to a second threshold, or when the difference between the first image and the third image is smaller than or equal to the first threshold and a difference between the third image and the second image is greater than or equal to the second threshold, it is determined that the first projector needs to be adjusted.

3. The evaluation method for an image projection system according to claim 1,
    wherein the first projector is not caused to project the projection image but the second projector is caused to project the projection image at the first timing and the third timing, and
    the first projector is caused to project the projection image and the second projector is not caused to project the projection image at the second timing.

4. The evaluation method for an image projection system according to claim 1,
    wherein the first projector is not caused to project the projection image but the second projector is caused to project the projection image at the first timing and the third timing,
    the first projector and the second projector are each caused to project the projection image at the second timing, and
    when a difference between the first image and the third image is smaller than or equal to a first threshold and a difference in color value between the first image and the second image is greater than or equal to a third threshold, or when the difference between the first image and the third image is smaller than or equal to the first threshold and a difference in color value between the third image and the second image is greater than or equal to the third threshold, it is determined that the first projector needs to be adjusted.

5. The evaluation method for an image projection system according to claim 1,
wherein the first projector and the second projector are each caused to project the projection image at the first timing and the third timing,
the first projector is not caused to project the projection image but the second projector is caused to project the projection image at the second timing, and
when a difference between the first image and the third image is smaller than or equal to a first threshold and a difference in color value between the first image and the second image is greater than or equal to a third threshold, or when the difference between the first image and the third image is smaller than or equal to the first threshold and a difference in color value between the third image and the second image is greater than or equal to the third threshold, it is determined that the first projector needs to be adjusted.

6. The evaluation method for an image projection system according to claim 1,
wherein the first projector, the second projector, and a third projector perform the stack projection, and
the projection state of the third projector is caused to be the same as the projection state of the second projector at the first timing, the second timing, and the third timing.

7. The evaluation method for an image projection system according to claim 6,
wherein the first projector is not caused to project the projection image but the second projector and the third projector are each caused to project the projection image at the first timing and the third timing,
the first projector is caused to project the projection image but the second projector and the third projector is not caused to project the projection image at the second timing, and
when a difference between the first image and the third image is smaller than or equal to a first threshold and a difference between the first image and the second image is greater than or equal to a second threshold, or when the difference between the first image and the third image is smaller than or equal to the first threshold and a difference between the third image and the second image is greater than or equal to the second threshold, it is determined that the first projector needs to be adjusted.

8. The evaluation method for an image projection system according to claim 6,
wherein the first projector is not caused to project the projection image but the second projector and the third projector are each caused to project the projection image at the first timing and the third timing,
the first projector, the second projector, and the third projector are each caused to project the projection image at the second timing, and
when a difference between the first image and the third image is smaller than or equal to a first threshold and a difference in color value between the first image and the second image is greater than or equal to a third threshold, or when the difference between the first image and the third image is smaller than or equal to the first threshold and a difference in color value between the third image and the second image is greater than or equal to the third threshold, it is determined that the first projector needs to be adjusted.

9. The evaluation method for an image projection system according to claim 6,
wherein the first projector, the second projector, and the third projector are each caused to project the projection image at the first timing and the third timing,
the first projector is not caused to project the projection image but the second projector and the third projector are each caused to project the projection image at the second timing, and
when a difference between the first image and the third image is smaller than or equal to a first threshold and a difference in color value between the first image and the second image is greater than or equal to a third threshold, or when the difference between the first image and the third image is smaller than or equal to the first threshold and a difference in color value between the third image and the second image is greater than or equal to the third threshold, it is determined that the first projector needs to be adjusted.

10. An image projection system comprising:
a first projector and a second projector that perform stack projection in a projection area;
a camera; and
one or more processors programmed to:
acquire a first image generated by the camera that captures the projection area at a first timing;
acquire a second image generated by the camera that captures the projection area at a second timing after the first timing;
acquire a third image generated by the camera that captures the projection area at a third timing after the second timing;
cause projection states of the first projector and the second projector at the third timing to be the same as the projection states of the first projector and the second projector at the first timing;
cause the projection state of the first projector to differ from the projection state of the second projector at least one of the first timing or the second timing;
cause the first projector to project a projection image at least one of the first timing or the second timing;
cause the second projector to project the projection image at least one of the first timing or the second timing; and
evaluate whether or not the first projector needs to be adjusted based on the first image, the second image, and the third image.

11. An image projection control apparatus comprising:
one or more processors programmed to:
acquire a first image generated by a camera that captures a projection area at a first timing;
acquire a second image generated by the camera that captures the projection area at a second timing after the first timing;
acquire a third image generated by the camera that captures the projection area at a third timing after the second timing;
cause projection states of a first projector and a second projector at the third timing to be the same as the projection states of the first projector and the second projector at the first timing;
cause the projection state of the first projector to differ from the projection state of the second projector at least one of the first timing or the second timing;

cause the first projector to project a projection image at least one of the first timing or the second timing;

cause the second projector to project the projection image at least one of the first timing or the second timing; and evaluate whether or not the first projector needs to be adjusted based on the first image, the second image, and the third image, wherein the image projection control apparatus communicably connected to the first projector, the second projector and the camera, and the first projector and the second projector perform stack projection in the projection area.

\* \* \* \* \*